(12) United States Patent
Das

(10) Patent No.: US 11,013,083 B2
(45) Date of Patent: May 18, 2021

(54) ELECTROLYTIC CAPACITORLESS, SELECTIVELY DIMMABLE LED DRIVER

(71) Applicant: The Research Foundation for The State University of New York, Binghamton, NY (US)

(72) Inventor: Pritam Das, Vestal, NY (US)

(73) Assignee: The Research Foundation for The State University, Binghanton, NY (US)

( * ) Notice: Subject to any disclaimer, the term of this patent is extended or adjusted under 35 U.S.C. 154(b) by 0 days.

(21) Appl. No.: 16/875,821

(22) Filed: May 15, 2020

(65) Prior Publication Data

US 2020/0375002 A1 Nov. 26, 2020

Related U.S. Application Data

(60) Provisional application No. 62/850,071, filed on May 20, 2019.

(51) Int. Cl.
| H05B 45/10 | (2020.01) |
| H05B 45/382 | (2020.01) |
| H05B 45/38 | (2020.01) |
| H02M 1/08 | (2006.01) |
| H05B 45/355 | (2020.01) |
| H02M 3/335 | (2006.01) |

(52) U.S. Cl.
CPC .......... *H05B 45/382* (2020.01); *H02M 1/083* (2013.01); *H02M 3/33569* (2013.01); *H05B 45/10* (2020.01); *H05B 45/355* (2020.01); *H05B 45/38* (2020.01)

(58) Field of Classification Search
CPC ........ H05B 45/10; H05B 45/20; H05B 45/30; H05B 45/38; H05B 45/355; H05B 45/382
See application file for complete search history.

(56) References Cited

U.S. PATENT DOCUMENTS

| 9,723,666 B2* | 8/2017 | Nakajo ................. H05B 45/37 |
| 2008/0224625 A1* | 9/2008 | Greenfeld .......... H05B 45/3725 |
| | | 315/201 |
| 2010/0270947 A1* | 10/2010 | Chang .................. H05B 45/382 |
| | | 315/294 |
| 2011/0006604 A1* | 1/2011 | Chang .................... H05B 45/37 |
| | | 307/31 |
| 2011/0248638 A1* | 10/2011 | Aso ........................ H05B 45/35 |
| | | 315/185 R |
| 2011/0309760 A1* | 12/2011 | Beland ................ H02M 1/4258 |
| | | 315/201 |

(Continued)

*Primary Examiner* — Tung X Le

(74) *Attorney, Agent, or Firm* — Hoffberg & Associates; Steven M Hoffberg

(57) ABSTRACT

An apparatus method for driving light emitting diodes (LEDs), comprising: receiving an alternating current input; producing a DC current having a voltage with an AC-DC boost power-factor correction stage, having a variable-frequency operation, and a set of switches controlled in dependence on the voltage to limit a peak LED current; and producing an LED drive current with a DC-DC power conversion stage having a set of switches to selectively pulse-width modulate the LEDs to control a brightness, wherein the set of switches in the AC-DC boost power-factor correction stage and the set of switches in the DC-DC power conversion stage are each controlled to switch at zero current.

20 Claims, 7 Drawing Sheets

(56) References Cited

U.S. PATENT DOCUMENTS

| | | | |
|---|---|---|---|
| 2013/0285565 A1* | 10/2013 | Feng ...................... | H05B 45/37 |
| | | | 315/186 |
| 2014/0265913 A1* | 9/2014 | Chung ................... | H05B 45/10 |
| | | | 315/291 |
| 2015/0002042 A1* | 1/2015 | Kim ....................... | H05B 45/37 |
| | | | 315/223 |
| 2015/0091463 A1* | 4/2015 | Jin ......................... | H05B 45/39 |
| | | | 315/201 |

* cited by examiner

Primary side peak current reference control for color temperature

ELECTROLYTIC CAPACITORLESS, SELECTIVELY DIMMABLE LED DRIVER

CROSS REFERENCE TO RELATED APPLICATIONS

The present application is a non-provisional of, and claims benefit of priority from, U.S. Provisional Patent Application No. 62/850,071, filed May 20, 2019, the entirety of which is expressly incorporated herein by reference.

FIELD OF THE INVENTION

The present inventions relates to the field of AC-DC power converters, and more particularly to a circuit and method for converting power main AC voltage to a DC driving current for LED lighting.

BACKGROUND OF THE INVENTION

AC-DC LED drivers suffer from short lifetime because of the low lifetime electrolytic capacitors used for DC bus decoupling.

There has been a growing Impetus to reduce energy consumption in urban buildings so as to reduce the related pollution of environment [1]. This has led to research and development of "NET ZERO Buildings" wherein a building or a group of buildings will produce their own energy from renewable energy sources (solar, etc. [2]) installed on site and will have highly energy efficient smart appliances which are operated optimally so as to reduce electrical power demand [3]. One of the key electrical loads in buildings is lighting. It constitutes about 10%-12% of the total electrical loads in a commercial building.

It has been found that LEDs (typically 180 lumens per watt [4]) are three times more efficient than Compact Fluorescent Lamps (CFL) (50-70 lm/W [5]) in converting electrical energy to light and also their disposal is easier than mercury filled CFL lamps. Optimized lighting with LED, precisely conforming to the exact needs for lumens in a certain zone in a building depending on available natural light and occupancy and other factors can significantly reduce the electrical energy demands for lighting. Also, LEDs can operate up to 100,000 hours, equivalently 10 years. Added to that is the ease of dimming of LEDs. LEDs require DC current for their operation, so available electrical energy from the utility mains or renewable energy needs to be converted into a constant current source. This is where lies the importance in developing the power electronics involved in driving LEDs.

Multi-channel LED drivers have the advantages of high efficiency and low device count compared to single-Channel LED drivers for large area lighting applications. In some applications, the LEDs connected to different channels of a multi-channel driver are required to operate at different brightness. In such applications, a multi-channel LED driver with selective dimming of its channels presents a cost effective solution. One commercial application for the LED drivers with the requirement of selective dimming is shown in FIG. 1. According to the indoor illumination design application, the illumination in a room prefers to keep at 500-600 lux. Therefore, the lamps installed near the window (Lamp4 in FIG. 1) should supply less brightness than the lamps installed away from the window (Lamp1) to save energy. However, four LED lamps are supplied by one LED driver, and hence it requires the LED driver to have the function of selective dimming for different groups of LED channels.

There are some solutions for multi-channel LED drivers with selective dimming proposed in [6-16]. One conventional method is to use multi LED drivers for each LED channel respectively to achieve selective dimming [6, 7]. This reduces the driver efficiency compared to multi-channel LED drivers because of multiple energy conversion stages. Also, it increases the total size and cost since a large number of active and passive components are needed for separate control of converters at the input of every LED channel.

Typically the efficiency of the LED drivers ranges from 75% to 85% only. This is due to the fact that the power converter topologies used in these drivers are based on single switch isolated DC-DC converters like the flyback converter [8] along with secondary side active switching devices, needed to operate at high switching frequency comparable to the primary side devices. This results in reduced overall efficiencies of such flyback converter based drivers.

Some non-isolated selective dimming LED drivers [9-13] are only available for low power and low voltage applications. However, for high power LED drivers, galvanic isolation is needed, and hence one more isolated stage of power conversion has to be added leading to increased cost and reduced efficiency. Some isolated resonant DC-DC selectively dimmed LED drivers are proposed in [14-16]. A switched capacitor based selective dimming LED driver presented in [14] uses non-resonant DC-DC stage for isolation and each pair of channels of LEDs can achieve selective dimming. However, it needs four diodes, one MOSFET, one filter inductor and several capacitors on the secondary side of DC-DC stage for each pair of channels.

An isolated Quasi-two-stage (PFC and resonant DC-DC) selective dimming LED driver [15, 16] uses two secondary side DC buses obtained from a resonant DC-DC stage for LED current and dimming control. However, an auxiliary Buck-Boost stage including one buck-boost control chip, one filter inductor, one MOSFET and one diode, has to be added for each channel to achieve the selective dimming.

Numbers of active or passive decoupling methods [3]-[33] of the LED drivers have been proposed to reduce the capacitance on the DC bus so as to use long lifetime film capacitors, instead of electrolytic capacitors, to increase the lifetime of LED drivers.

An auxiliary valley-fill circuit based method with increased voltage stress of the boost devices for mitigating ripple power variation is proposed in [3], [4]. An auxiliary bidirectional buck-boost converter connected parallel to the DC bus based on the flyback topology [5]-[7] is proposed for decoupling.

Three port converter based decoupling circuits are proposed in [8]-[17]. One of the major drawbacks of three-port based decoupling method [8]-[17] is that the third port with auxiliary active or passive devices reduces efficiency and increases cost compared to conventional flyback or forward based converters. Other flyback based converters for ripple cancellation are proposed in [18], [19]. In [18], an integrated stage design which combines single-ended primary inductor converter (SEPIC) and flyback converter, is proposed to eliminate electrolytic capacitors. Another flyback based converter with an active rectifier and a unidirectional circuit for decoupling is proposed in [19] with extra efficiency loss.

The buck-boost based converters [20]-[22] and boost based converter [23] are also used for ripple decoupling. In [20], a buck-boost converter, followed by a buck converter with auxiliary power flow, is proposed for ripple cancellation. An integrated double buck-boost converter with active-ripple-compensation technique is proposed in [21] leading to half reduction of capacitance. Two buck-boost converters based topology is introduced in [22] to reduce the output current ripple. However, the THD and capacitance of this topology are still considerable. In [23], a boost PFC followed by a forward converter topology is proposed to reduce half of capacitance with the method of zero-low-level square-wave driving current.

Single-stage asymmetrical resonant based converters [24], [25] and multiple-stage resonant based converters [26]-[30] are proposed for decoupling. In [24], an asymmetrical resonant converter integrated with boost or buck-boost PFC stage with variable frequency and duty ratio control is proposed to reduce capacitance. An asymmetrical half-bridge resonant converter based LED driver Integrated with bridgeless boost PFC stage is proposed in [25] for reduction of capacitance.

A two-stage LED driver Including integrated boost PFC and resonant converter, and twin-bus multiple buck-type current regulators is proposed in [26] for decoupling. A pulse frequency modulation (PFM) applied in this topology leads to that the bus voltage is more than twice the peak of input voltage. An improved control method of a hybrid PFM-asymmetric PWM strategy with 3% efficiency reduction is proposed in [27] to reduce the bus voltage. In [28], a two-stage LED driver with an additional hybrid film-ceramic stacked switched capacitor (SSC) energy buffer for ripple decoupling is introduced. However, the SSC energy buffer with reduced overall efficiency requires extra active and passive devices for operation. An electronic ballast for LED application is proposed in [29]. The high-cost electrolytic capacitors are used on the secondary side, instead of primary side of the transformer in this topology. In [30], a three-stage LED drive using third stage of buck converters for ripple decoupling is proposed. However, these additional buck converters with extra efficiency loss require bulky inductive output filters for each channel of LEDs.

The LED drivers without electrolytic capacitors are also developed with two-stage asymmetrical half-bridge (AHB) based converters [31]-[33].

Table II shows a comparison of LED driver circuits for N groups of selective dimming.

A multi channel LED driver with efficiency >94% using Silicon superjunction devices and SiC diodes have been demonstrated in:
1) C. Ye, P. Das and S. K. Sahoo, "Peak Current Control based Power Ripple Decoupling of AC-DC Multi-Channel LED Driver," in IEEE Transactions on Industrial Electronics (2019). doi: 10.1109/TIE.2019.2893853.
2) C. Ye, P. Das and S. Kumar Sahoo, "Peak Current Control of Multichannel LED Driver With Selective Dimming," in *IEEE Transactions on Industrial Electronics*, vol. 66, no. 5, pp. 3446-3457, May 2019. doi: 10.1109/TIE.2018.2856179.
3) R. Kathiresan, P. Das, T. Reindl and S. K. Panda, "Novel High-Power Nonresonant Multichannel LED Driver," in *IEEE Transactions on Industrial Electronics*, vol. 64, no. 7, pp. 5851-5864, July 2017. doi: 10.1109/TIE.2017.2652396.
4) WO/2018/038681 (PCT/SG2017/050413) "A Multi-Channel Driver Circuit And Method For LEDS"
5) U.S. Patent Application No 20170280523 (Sep. 28, 2017), Each of the foregoing is expressly incorporated herein by reference in its entirety.

SUMMARY OF THE INVENTION

A primary side peak current control method is applied to control the peak value of LED currents by controlling the primary side switches. This method prevents high instantaneous and repetitive peak currents in LED loads during the ON time of PWM-based dimming of all or selected channels, which is essential for mitigating electromigration in LED loads. The brightness based on average current of each group of LEDs is controlled by duty ratios of four secondary side switches, respectively. This topology has the advantages of high power capability, high efficiency (>94%) with complete soft switching of primary side switches, and zero voltage switching (ZVS) turning OFF of secondary side rectifier diodes, and reduction in power conversion stage.

A multi-channel LED driver consisting of front-end AC-DC boost Power Factor Correction (PFC) converter followed by a DC-DC power conversion stage with selective dimming capability for LED based lighting is provided. Selective dimming of groups of output channels of a multi-channel LED driver comprising of symmetric half bridge non-resonant DC-DC converter, high frequency transformer and symmetric voltage multiplier output rectifier with purely capacitive output is accomplished. The driver has the advantages of low device count, high efficiency and can handle high power. A primary side peak current control method is applied to control the peak value of primary side current, and hence the LED peak current, by controlling the primary side switches. The brightness based on average current of four groups of LEDs is controlled by duty ratios of four primary side switches, respectively.

A long lifetime and small film capacitor is used for implementing the intermediate DC bus. The primary side peak current control method which controls the peak value of the primary side current of the transformers is applied to the DC-DC stage to ensure constant DC current output of LEDs in spite of the widely varying DC bus voltage due to low bus capacitance. The peak current control approach compensates the effect of the large DC bus voltage ripple by automatically varying the switching frequency of the primary side devices and hence the gain of the DC-DC converter.

According to the present invention, a primary side peak current control method is applied for driving a two-stage multi-channel LED driver. The LED driver consists of an AC-DC boost power factor correction stage, and an isolated DC-DC non-resonant stage. A long lifetime and small film capacitor is used for implementing the intermediate DC bus. The technology controls the peak value of the primary side current of the transformers, applied to the DC-DC stage, to ensure constant DC current output of LEDs in spite of the widely varying DC bus voltage due to low bus capacitance.

The technology compensates the effect of the large DC bus voltage ripple by varying the switching frequency of the primary side switches.

Selective dimming of LED channels may be performed by low frequency switched bidirectional switches provided in parallel to the power transformers. Cycle by cycle peak current mode control, with time multiplexing, is used to control both the peak and the average currents in each channel, so as to realize individual dimming while maintaining a fixed peak on-state current in each channel of LEDs.

A new topology for multi-channel LED driver with selective dimming of output channels is provided herein. The topology is based on a non-resonant multi-channel equivalent dimming LED driver [17] with the advantages of high power and efficiency, complete soft switching of all high frequency switched semiconductor devices, reduction in power conversion stage, and inherent protection against LED failures for both electrically open and short circuit conditions of the LEDs. In this topology, selective dimming is achieved for groups of output channels of a multi-channel LED driver comprising a symmetric half bridge DC-DC converter, high frequency transformer and symmetric voltage multiplier output rectifier with purely capacitive output. This topology has the advantages of low device count, high power and high efficiency (>94%). The present design employs a truly single DC-DC stage converter, which reduces additional active and passive devices resulting in reduced cost and increased electrical efficiency.

The present technology eliminates need for use of an electrolytic capacitor, which permits long lifetime and high temperature operation.

The present technology also avoids need for a sensor for determining actual LED current in each LED channel, and a feedback mechanism employing the sensor output, by controlling he peak current during every cycle of operation.

The present technology permits the primary side to be completely disabled when all channels at the output are shorted during pulse width modulation dimming. The technology controls both LED ON-state peak current, and average current, which in turn eliminates chromatic shift in LEDs, and also control the luminosity of the LED channels.

The switches in the secondary side, which providing dimming capability, are configured to short the transformers which, when controlled with a peak current limitation in the primary side, limit the power dissipated, and improves efficiency as compared to series-connected switches.

The controller may be implemented in an ARM Cortex processor microcontroller.

The non-resonant energy conversion is achieved by energizing and de-energizing the high leakage inductance of the high frequency transformer T1 and T2 results in globally asymptotic stability of the converter.

The wide load range zero voltage switching of primary side switches is realized using the extremums of the transformer primary side current.

The converter operates in the lagging current mode wherein the zero crossings of the transformer primary side current lags those of the output voltage at the output of the half-bridge converter.

No high voltage DC blocking capacitor is necessary due to symmetry of the half bridge used.

Selective dimming of each group of LED channels with LED peak current control eliminates electromigration related aging of LEDs Hybrid analog and digital peak current control is applied for the DC-DC stage, with variable frequency control of primary side switches. Based on this control method, the electrolytic capacitor traditionally used on the DC bus, e.g., in [34], is replaced by a small film capacitor without adding any auxiliary active or passive power devices.

The technology merges two technologies: (1) elimination of electrolytic capacitor at the input permits extended lifetime (beyond 2 years) under high ambient temperatures (>60 C) for applications in high power luminaires (>300 W). This is done by a unique cycle by cycle control of peak current of the transformer primary side current in the DC DC converter. (2) Using the same control technology and adding a shorting device across each transformer primary for realizing selective dimming of individual channels and also controlling the LED peak currents during their ON times. This peak current control is essential for mitigating cross talk between channels during selective dimming and also eliminates electro-migration related damage in LEDs due to high ON state currents during selective dimming, especially in extreme cases of say only a single channel out of four or more channels working.

It is therefore an object to provide a driver circuit for light emitting diodes (LEDs), comprising: an input configured to receive an alternating current input; an AC-DC boost stage, having a set of switches controlled to limit a peak LED current; a DC-DC power conversion stage having a set of switches; a controller configured to control the set of switches in the AC-DC boost stage to provide power to the DC-DC power conversion stage, while limiting peak LED current, and to control and the set of switches in the DC-DC power conversion stage to selectively pulse-width modulate the LEDs to control an LED brightness, wherein the set of switches in the AC-DC boost stage and the set of switches in the DC-DC power conversion stage are each controlled to switch at zero voltage; and an output configured to supply power to the LEDs with the pulse width modulated output of the DC-DC power conversion stage. The AC-DC boost stage may have a variable frequency.

It is also an object to provide a method for driving light emitting diodes (LEDs), comprising: receiving an alternating current input; producing a DC current having a voltage with an AC-DC boost stage, and a set of switches controlled in dependence on the voltage to limit a peak LED current; producing an LED drive current with a DC-DC power conversion stage having a set of switches to selectively pulse-width modulate the LEDs to control a brightness, wherein the set of switches in the AC-DC boost stage and the set of switches in the DC-DC power conversion stage are each controlled to switch at zero voltage.

The driver circuit may comprise a plurality of DC-DC power conversion stages sharing a common AC-DC boost stage, wherein each DC-DC power conversion stage is controlled to have an independent pulse width modulation to control the brightness of respective LEDs receiving power from the respective DC-DC power conversion stage.

The DC-DC power conversion stage may be non-resonant. The DC-DC power conversion stage may comprise a symmetric half-bridge non-resonant DC-DC converter, a high frequency transformer, and a symmetric voltage multiplier output rectifier with purely capacitive output. The DC-DC power conversion stage may be substantially without an electrolytic capacitor passing a load current.

A frequency of operation of the AC-DC boost stage may be varied in dependence on at least a varying DC bus voltage, wherein the DC-DC power conversion stage receives power from the DC bus.

The controller may be configured to implement cycle by cycle peak current mode control, with time multiplexing, to control both the peak and the average currents to the LED. The controller may be configured to control the switches of the AC-DC boost stage to correct a power factor.

BRIEF DESCRIPTION OF THE DRAWINGS

FIG. 2 shows modes of operation for LED Groups 1 and 2 during different states of switches SG1 and SG2. (a) No switches is ON. (b) SG1 is ON. (c) SG2 is ON (d) Both SG1 and SG2 are ON.

DETAILED DESCRIPTION OF THE PREFERRED EMBODIMENTS

Figure 1:
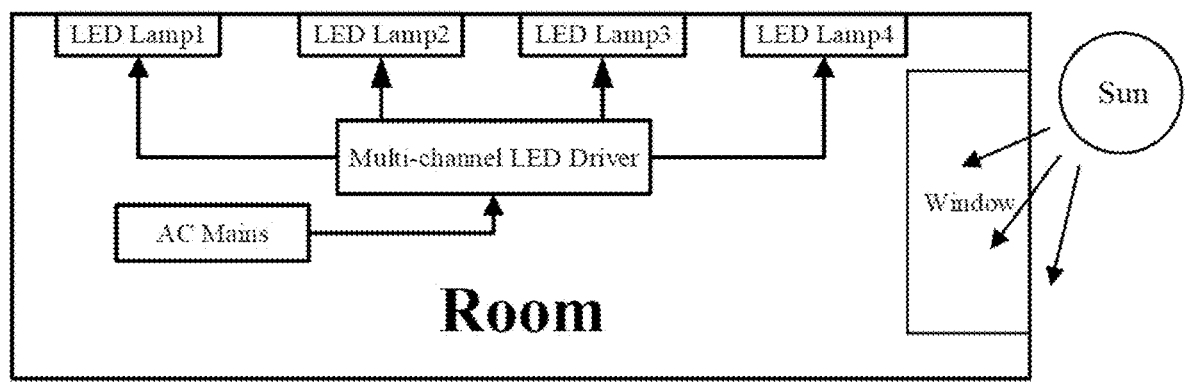
FIG. 1 shows selective dimming multi-channel LED driver application.
Figure 2A:
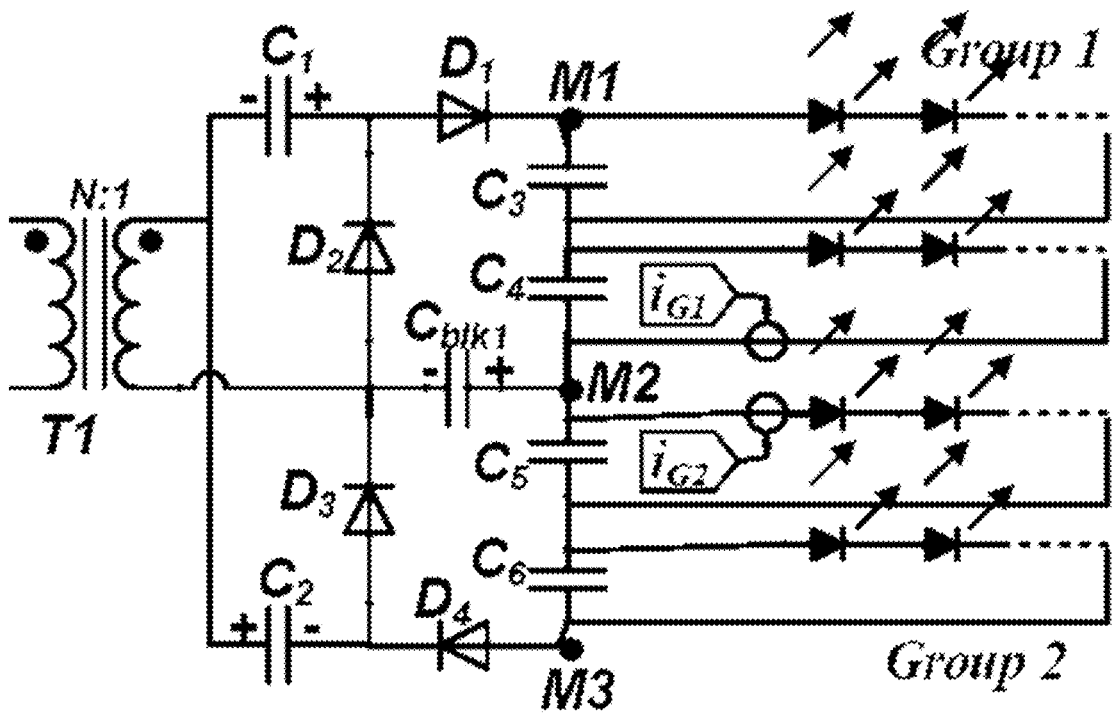
Figure 2B:
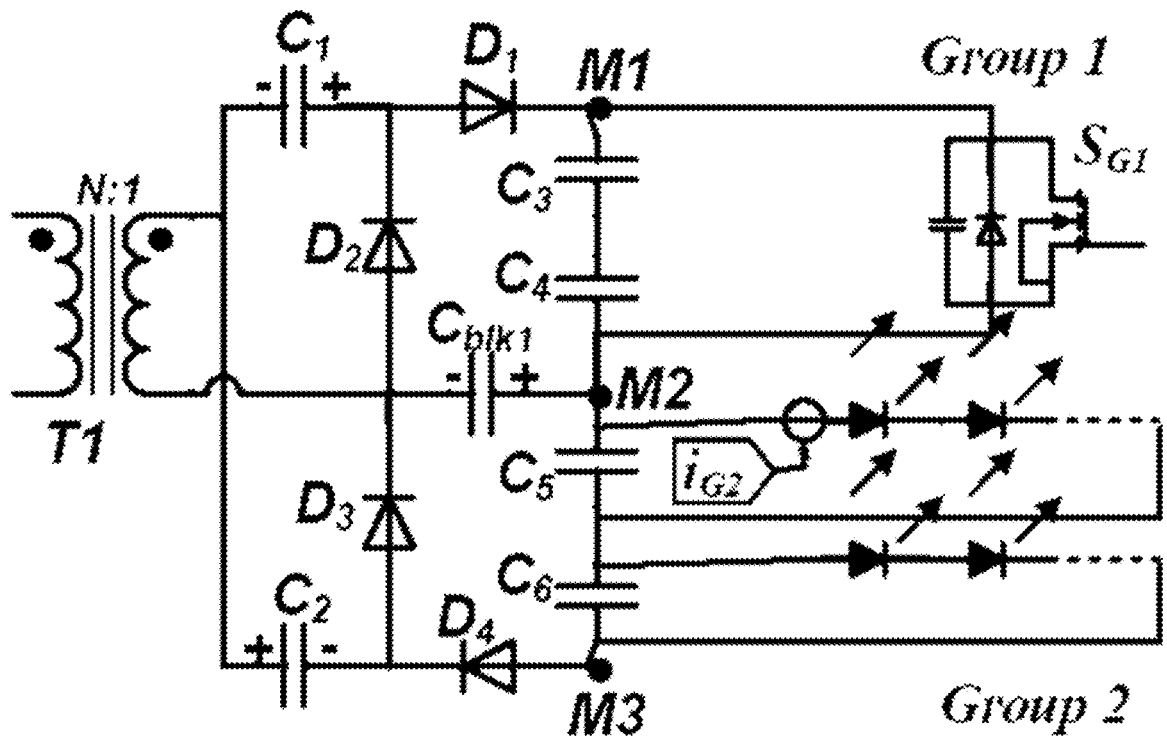
Figure 2C:
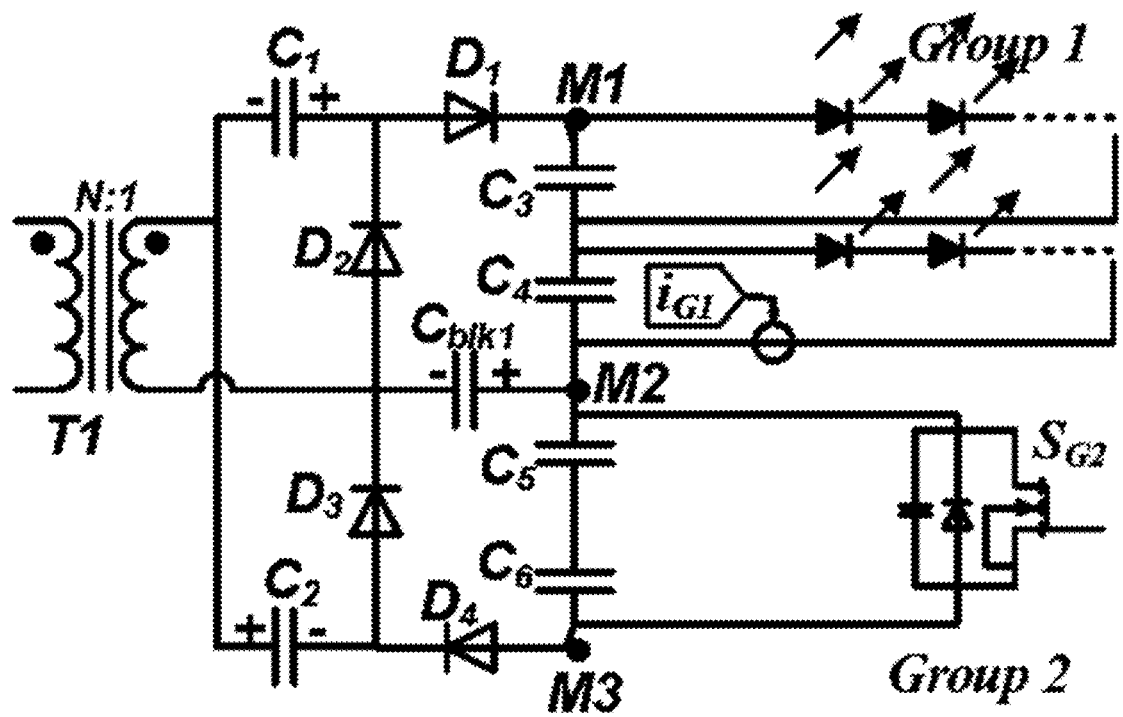
Figure 2D:
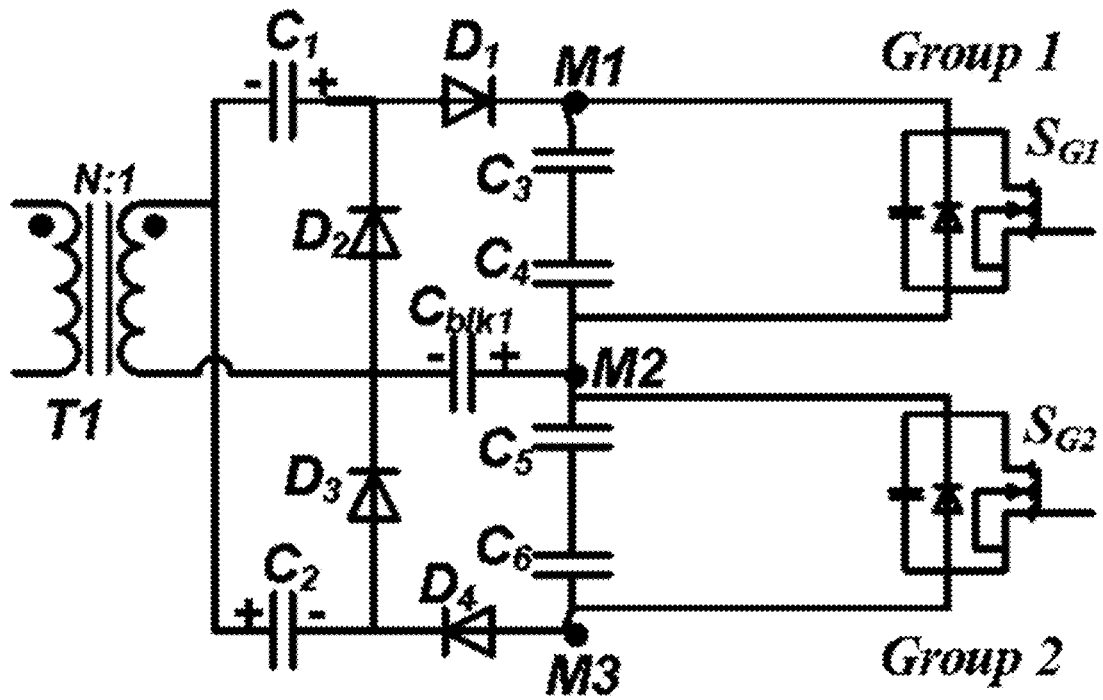

The selective dimming multi-channel LED driver has AC mains input, that according to a preferred implementation, can vary from 90Vac to 265Vac. The AC mains passes through a rectifier and PFC boost circuit which accomplishes input power factor correction (PFC) and also boosting input AC to DC output voltage VDC (around 400 Vdc). This DC voltage $V_{DC}$ feeds a housekeeping flyback converter with an isolated DC output (about 12 Vdc) for the switches gate drive power supply, and also an LDO so as to produce a $3.3V_{DC}$ output for micro-controller and signal circuit power supply. The main function of $VD_C$ is to power the selective dimming isolated non-resonant DC-DC converter according to the present technology.

In this part of the circuit, the DC bus voltage $V_{DC}$ is converted to a high frequency bipolar AC waveform by properly gating the switches S1 and S2 ON and OFF on the primary side of transformers T1 and T2. This high frequency AC voltage is incident across the primary side of the high frequency transformers T1 and T2 that provides galvanic isolation of the output LEDs from the input AC mains. The secondary side symmetric quadrupler rectifiers rectify the secondary side high frequency AC current to drive LED loads.

The control of the primary side switches depends on the peak value of the transformer primary side current, which is proportional to the LED current, and the control of secondary side switches depends on the reference values of average LED currents.

This topology uses a symmetric half bridge non-resonant DC-DC converter, two high frequency transformers T1 and T2 to control the brightness of each of the four groups of LED channels by selectively switching ON and OFF four secondary switches SG1, SG2, SG3 and SG4. The secondary side switches will be operated at the frequency $f_{SG}$ (1 kHz) of PWM dimming which is much less than the switching frequency $f_{SW}$ (80 kHz-130 kHz) of primary side switches. Primary side switches S1 and S2 are used to control the peak value of primary side current $I_{pri,pk}$ by sampling the primary side current $i_{pri}$ and hence control the peak current of LEDs. Secondary side switches aim to control the average current of each group of LEDs by sampling each group of LED currents $i_{G1}$, $i_{G2}$, $i_{G3}$ and $i_{G4}$, respectively.

On the primary side of transformers T1 and T2, due to the capacitors $C_{b1}$ and $C_{b2}$ of equal capacitances, the voltage across them is about $V_{DC}/2$. When the switch S1 is ON and S2 is OFF, the voltage across A and B is about $V_{AB}=V_{DC}/2$. In this situation, the primary side current $i_{pri}$ of transformers increases due to the positive voltage across the combined leakage inductance Llk of the primary side of transformers. When S1 is OFF and S2 is ON, the voltage $V_{AB}=-V_{DC}/2$. In this situation, the primary side current $i_{pri}$ reduces due to the negative voltage. Once the primary side current $i_{pri}$ reduces to zero, it will ramp in the negative direction. As a result of this charging and discharging of the primary side leakage inductor Llk, energy is transferred from the primary side to secondary side of the transformers. The rectifiers (symmetric voltage quadrupler) on the secondary side will rectify the high frequency AC current to drive the LED loads. It should be noted that each primary side switch is ON for half of the total switching cycle. By changing the frequency of the gating waveforms of the switches S1 and S2, the peak value of primary side current $I_{pri,pk}$ of the transformers T1 and T2 is varied, which leads to the variation in the energy transferred through the transformers and hence the average current fed to the output LEDs whose light intensity can hence be varied. For example, by increasing the frequency $f_{SW}$ of switches S1 and S2, the charging or discharging time of the primary side leakage inductor Llk reduces. As a result, the peak value of primary side current $I_{pri,pk}$ reduces, and hence the peak currents and average currents of LED loads reduce when they are in the ON state, and vice versa.

FIG. 2 shows modes of operation for LED Groups 1 and 2 during different states of switches SG1 and SG2. (a) No switches is ON. (b) SG1 is ON. (c) SG2 is ON (d) Both SG1 and SG2 are ON.

For the secondary side of the transformers T1 and T2, the LED currents of four groups of LED channels are controlled by four secondary side switches SG1, SG2, SG3 and SG4, respectively. When SG1 is ON, the LEDs of Group 1 will be OFF, and when SG1 is OFF, the LEDs of Group 1 will be ON. Similarly, the switches SG2, SG3 and SG4 control the brightness of the LEDs of Group 2, 3 and 4, respectively.

Based on the control of secondary side switches SG1, SG2, SG3 and SG4, the average currents of groups of LED channels to be dimmed simultaneously are sensed and fed back to the controller which controls the duty ratio of the gating pulses of the secondary side switches to realize selective dimming for four groups of LEDs.

In [34], a large electrolytic capacitor $C_{bus}$ is used on DC bus for mitigating the double line frequency power-ripple from the AC input. With negligible DC bus ripple, the constant frequency control of switches S1 and S2 can be applied in DC-DC stage for constant LED DC current output.

The ripple voltage in DC bus is given by (1).

$$v_r(t) = -\frac{P_o}{2\omega C_{bus} V_{DC}} \sin(2\omega t) \qquad (1)$$

where $v_r(t)$ is AC ripple voltage of DC bus, $P_o$ is output power, $V_{DC}$ is average voltage of DC bus, $\omega=2\pi f$ and f is line frequency of input voltage. Hence, $V_{DC}(t)$ can be given by (2).

$$v_{dc}(t) = V_{DC} + v_r \qquad (2)$$

The electrolytic capacitor $C_{bus}$ traditionally used in other architectures is replaced by a low-value long lifetime film capacitor. This results in higher DC bus voltage ripple based on (1). The effect of the DC bus voltage ripple is eliminated from the LED output current by the control method described herein.

A. Primary Side Peak Current Control Method

In this LED driver, the LED DC currents can be maintained constant by controlling the peak value of primary side current $I_{pri,pk}$ based on sampling primary side current of transformers $i_{pri}$. As described in [34], the symmetric complementary constant frequency control of the switches S1 and S2 transfers the energy through transformers to supply LEDs. However, this constant frequency control will result in LED currents having second harmonic ripples similar to $v_{dc}(t)$. This leads to the low frequency flicker of LED light output and lifetime reduction due to higher peak currents of LEDs. In order to keep the LED output current constant, the switching frequency $f_{SW}$ of switches S1 and S2 needs to vary based on $v_{dc}(t)$, which in turn will vary the gain of the DC-DC non-resonant converter. The peak current control method keeps $I_{pri,pk}$ constant to ensure constant DC current output of LEDs.

Figure 3:
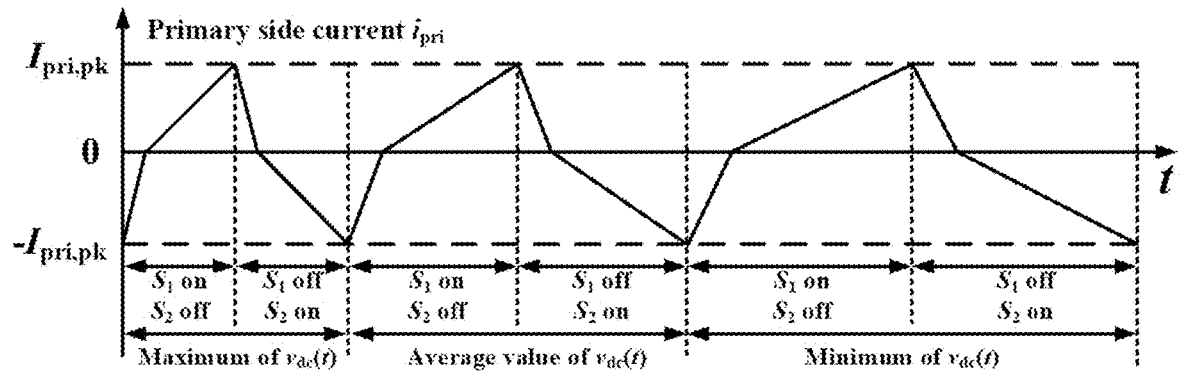
FIG. 3 shows waveforms of switching frequency $f_{SW}$ and maximum, average, minimum values of $v_{dc}(t)$ under proposed peak current control.

FIG. 3 shows the relationship between the switching frequency $f_{SW}$ and maximum, average, minimum values of $vd_c(t)$ under the proposed method. The gating signals of switches S1 and S2 are obtained by comparing $i_{pri}$ with $I_{pri,pk}$. When $i_{pri}$ reaches $I_{pri,pk}$, S1 is turned OFF and S2 is turned ON. Similarly, when $i_{pri}$ reaches $-I_{pri,pk}$, S1 is turned ON and S2 is turned OFF. This automatically results in variable switching frequency based on the instantaneous DC bus voltage while maintaining a constant value of $I_{pri,pk}$. Based on the symmetric quadrupler rectifier principles [35], the voltages of transformer secondary side windings ($v_{sec}$, T1 for T1 and $v_{sec}$, T2 for T2) are proportional to the average LED voltages of each channel. Therefore, the expressions for vsec, T1, vsec, T2, and the average voltages of LED channels 1-4 $V_{T1,avg}$ and channels 5-8 $V_{T2}$,avg are given by (3)-(4).

$$v_{sec,T1} = \begin{cases} V_{T1,avg}, & \text{for } i_{pri} > 0 \\ -V_{T1,avg}, & \text{for } i_{pri} < 0 \end{cases} \quad (3)$$

$$v_{sec,T2} = \begin{cases} V_{T2,avg}, & \text{for } i_{pri} > 0 \\ -V_{T2,avg}, & \text{for } i_{pri} < 0 \end{cases} \quad (4)$$

Figure 4:
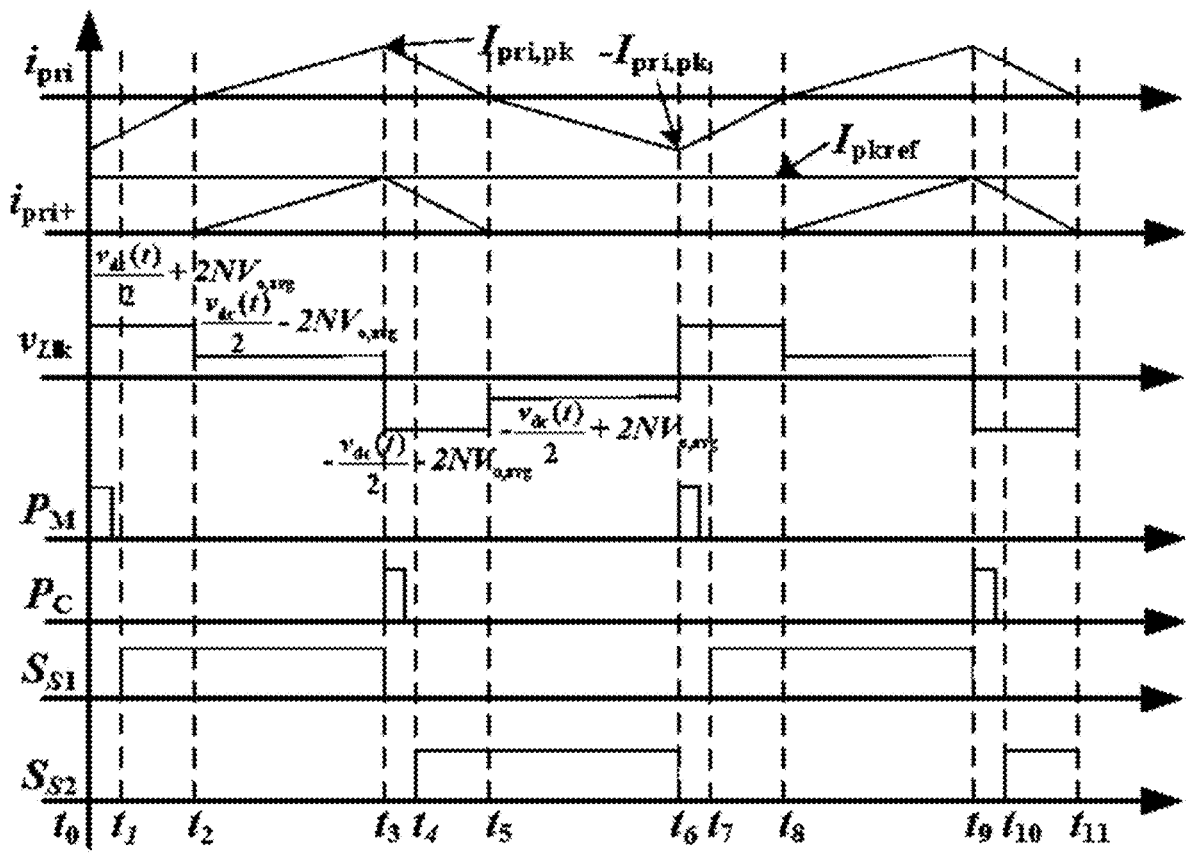
FIG. 4 shows waveforms of the primary side current of transformers ipri, positive part of primary side current of transformers $i_{pri+}$, combined leakage inductor voltage $v_{Llk}$, pulse signal from micro-controller PM, pulse signal from comparator PC, gating control pulses SS1 and SS2 of switches S1 and S2, respectively, under proposed peak current control.

FIG. 4 shows the operating waveforms of primary side peak current control. At t0, signal SS2 turns OFF and ipri starts to increase. After 300 ns dead-time at t1, signal SS1 turns ON. This stage will end at T2 when signal $i_{pri+}$ reaches to $I_{pkref}$ because the comparator in FIG. 6 generates the peak current detection pulse PC to trigger the D flip-flop. Therefore, signal SS1 turns OFF at T2, signal SS2 will turn ON after 300 ns delay at T3, and $i_{pri}$ decreases from T2. At T4, micro-controller generates a pulse PM to trigger D flip-flop. This pulse PM is generated based on the time (T4–T2), which is equal to time (T2–T0), to make symmetric ON time of signals SS1 and SS2. Similarly, at T4, signal SS2 turns OFF, signal SS1 will turn ON after 300 ns delay at T5, and $i_{pri}$ starts to increase again from T4. The positive peak of $i_{pri}$ will be equal to the magnitude of the negative peak of $i_{pri}$ due to the symmetric nature of the half-bridge topology and symmetric ON time of switches S1 and S2 in one switching cycle.

Based on (3)-(4), the voltage $v_{Llk}$ of inductor Llk is shown in FIG. 4, where $V_{o,avg}$ is the average LED voltage of channels 1-8, and $V_{o,avg}$ is derived by (5), N is the transformer turns ratio.

$$V_{o,avg} = \frac{V_{T1,avg} + V_{T2,avg}}{2} \quad (5)$$

Hence, $i_{pri}$ can be derived by (6) from T0 to T2, and by (7) from T2 to T3 based on FIG. 4.

According to (6) and (7), $f_{SW}$ can be derived by (8). As described in [34], 300 ns dead-time between signals SS1 and SS2 achieves the complete soft switching of switches S1 and S2, where SS1 and SS2 are the gating control pulses of switches S1 and S2, respectively.

$$\frac{di_{pri}}{dt} = \left(\frac{v_{dc}(t)}{2} + 2NV_{o,avg}\right)/L_{lk} \quad (6)$$

$$\frac{di_{pri}}{dt} = \left(\frac{v_{dc}(t)}{2} - 2NV_{o,avg}\right)/L_{lk} \quad (7)$$

The DC bus voltage $v_{dc}(t)$ has considerable second harmonic ripple due to low DC bus capacitance. However, $V_{o,avg}$ remains constant since $I_{pri,pk}$ and average current of LEDs are controlled to be constant by the control method. Hence, $f_{SW}$ in (8) reduces with reduced $v_{dc}(t)$ as shown in FIG. 3.

$$f_{SW} = \frac{\left(\frac{v_{dc}(t)}{2}\right)^2 - (2NV_{o,avg})^2}{2v_{dc}(t)L_{lk}I_{pri,pk}} \quad (8)$$

Figure 6:
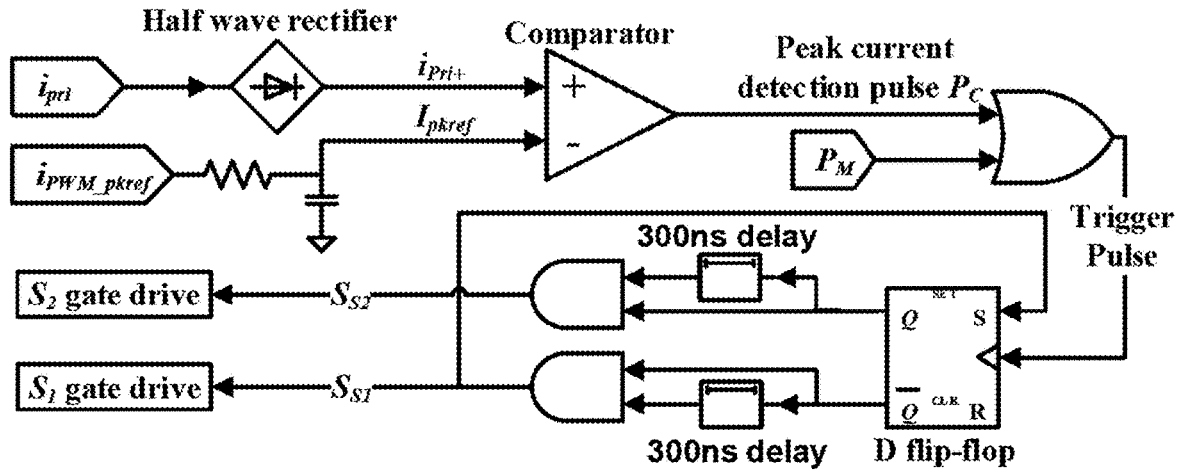
FIG. 6 shows analog control circuit of primary side peak current control.

Selective Dimming Control by Peak Current Control:

The control method is realized by switching the primary side switches S1 and S2 at $f_{SW}$ which varies depending on varied $v_{dc}(t)$. FIG. 6 shows the analog control circuit of proposed primary side peak current control. Signal $i_{pri+}$ is the positive half wave of $i_{pri}$. The reference value of primary side peak current $I_{pkref}$ is obtained by filtering the micro-controller PWM signal $i_{PWM\_pkref}$ with an RC filter. Note that $I_{pkref}$ can be adjusted by duty ratio of the PWM signal $i_{PWM\_pkref}$. Signal $i_{pri+}$ is compared with signal $I_{pkref}$ to obtain the peak current detection pulse PC. Another pulse signal PM from micro-controller (MCU) combined with the pulse PC constitutes the trigger pulse of the D flip-flop. The D flip-flop is used to change the states of signals SS1 and SS2, while signal SS1 is the input signal of the D flip-flop. The positive output of D flip-flop combined with 300 ns delay of this signal passes through an AND gate to obtain signal SS1. Similarly, the inverted output of D flip-flop combined with 300 ns delay of this signal goes through an AND gate to get signal SS2. This 300 ns delay is to create the dead-time between signals SS1 and SS2.

Figure 7A:
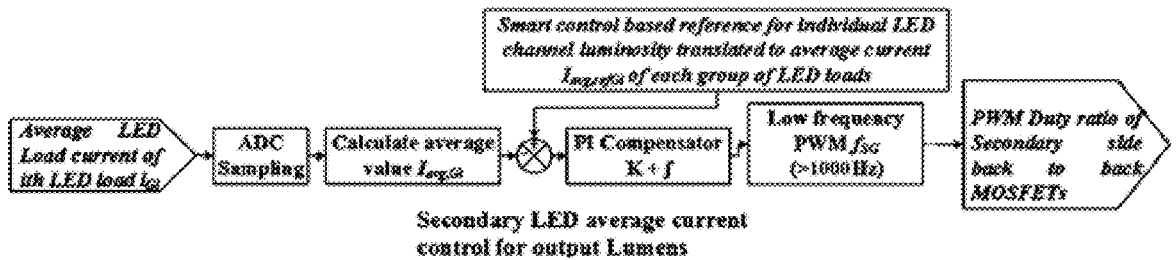
FIG. 7A shows a controller for the driver for the secondary side LED current control.

FIG. 7A shows the closed loop control of secondary side average current of LEDs. Based on the sampled LED current of Channel 8 $i_{CH8}$, the average value of this channel LED current $I_{CH8,avg}$ can be obtained. The reference value of LED average current $I_{LED,avg,ref}$ will be set to compare with $I_{CH8,avg}$ by a PI controller with a bandwidth of 0.1 Hz to update and adjust the PWM duty ratio of signal $i_{PWM\_pkref}$ so as to adjust $I_{pkref}$. Hence, the primary side peak current $I_{pri,pk}$ is adjusted to follow its reference value $I_{pkref}$. As a result, the LED average current will be controlled at a stable reference value $I_{LED,avg,ref}$. FIG. 7A combined with FIG. 6 shows the closed loop control of average current of LEDs.

Figure 7B:
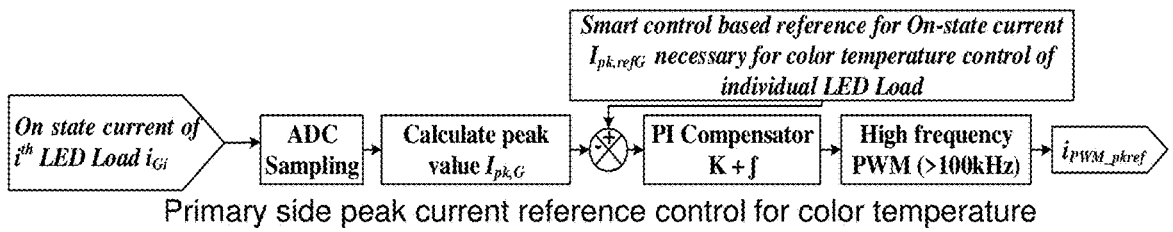
FIG. 7B shows a controller for the driver of the primary side peak current control.

FIG. 7B shows the flow chart of the primary side peak current reference control. Based on the sampled currents of LEDs $i_{Gi}$, the peak value of LED currents $I_{pk,G}$ can be obtained. The reference value of LED peak current $I_{pk,refG}$ is used to compare with $I_{pk,G}$ by a PI controller with a frequency of 0.1 Hz to update and adjust the PWM duty ratio of signal $i_{PWM\_pkref}$. Hence, the reference value of primary side peak current $I_{pkref}$ is controlled as shown in FIG. 6 for limiting the primary side peak current $I_{pri,pk}$. As a result, the LED peak current will be restricted at a stable reference value $I_{pk,refG}$ necessary for extended lifetime of LEDs [28]. FIG. 7B combined with FIG. 7A shows the closed-loop control of LED peak current. Summarizing, this control method maintains the peak current as well as average current in each group of LEDs with equal or selective dimming requirement.

Analysis of the Converter with Peak Current Control

The LED driver with proposed peak current control is designed and analyzed under 180 W setup.

The specification of this driver is shown as follows:
1) DC bus voltage $v_{dc}(t)$=380-520 V, with average voltage of 450 V and 10 µF film capacitor on DC bus;
2) Universal input voltage: 90 $V_{rms}$-264 $V_{rms}$, 47 Hz-63 Hz;
3) Each channel LED DC output voltage $V_o$=0-45 Vdc, and LED DC current $I_0$=0-0.7 $A_{dc}$;
4) Input power factor: higher than 0.97 at full load, and input current harmonics satisfying IEC EN 61000-3-2 Class C;
5) PWM dimming (3 kHz) of LEDs for down to 5%.

A. Steady-State Analysis

The output DC bus voltage $v_{dc}(t)$ of the boost PFC converter should be larger than the peak value of maximum input AC voltage $V_{in,max}$. Meanwhile, $v_{dc}(t)$ should be lower than $\alpha V_{dev}$, where $V_{dev}$ is the device rated voltage on DC bus, and a is the de-rating factor of the device. Hence, the requirement is $v_{dc}(t)$ should be equal to (9). Based on (1), (2) and (9), (10) is derived. When $V_{DC}=(V_{in,max}+\alpha V_{dev})/2$, $C_{bus}$ is minimal.

$$V_{in,max} < v_{dc}(t) < \alpha V_{dev} \quad (9)$$

$$C_{bus} > \max\left\{\frac{P_o}{2\omega V_{DC}(\alpha V_{dec} - V_{DC})}, \frac{P_o}{2\omega V_{DC}(V_{DC} - V_{in,max})}\right\} \quad (10)$$

Considering the worst case of this LED driver, Po=180 W, the minimum value of f is 47 Hz, Vin,max=374 V. For 600 V rated MOSFETs on DC bus with 0.9 derating factor, $\alpha V_{dev}$=540 V. Under this condition, the minimum value of $C_{bus}$ is about 8 µF. For the analysis and experimental prototype of this LED driver, $C_{bus}$=10 µF is chosen.

Based on the symmetric quadrupler rectifier principles [35], the average value of rectified current on the transformer secondary side windings is equal to four folds of the output current Io of LEDs. Under the steady-state operation of the converter, the currents of the transformer secondary side windings ($i_{sec1}$ for T1, isec2 for T2) are equal to $Ni_{pri}$. Hence, the relationship between average value of rectified current of transformer primary side winding $|i_{pri}|avg$, average values of rectified currents of transformer secondary side windings ($|i_{sec1}|$avg for T1, $|i_{sec2}|$avg for T2), and LED DC output current $I_o$ can be given by (11).

$$N|i_{pri}|_{avg} = |i_{sec1}|_{avg} = |i_{sec2}|_{avg} = 4I_o \quad (11)$$

The rectified current of transformer primary side winding $|i_{pri}|$ is close to a triangle, so that (12) can be derived.

$$|i_{pri}|_{avg} = \frac{1}{2}I_{pri,pk} \quad (12)$$

Therefore, according to (1), (2), (8), (11) and (12), the relationship among the average voltage of LED channels $V_{o,avg}$, the DC output current of LEDs Io, and the switching frequency $f_{SW}$ can be given by (13).

$$f_{SW} = \frac{\left[\left(\frac{V_{DC}}{2} - \frac{2V_{o,avg}I_o}{\omega C_{bus}V_{DC}}\sin(2\omega t)\right)^2 - (2NV_{o,avg})^2\right]N}{16\left[V_{DC} - \frac{4V_{o,avg}I_o}{\omega C_{bus}V_{DC}}\sin(2\omega t)\right]L_{lk}I_o} \quad (13)$$

Figure 5:
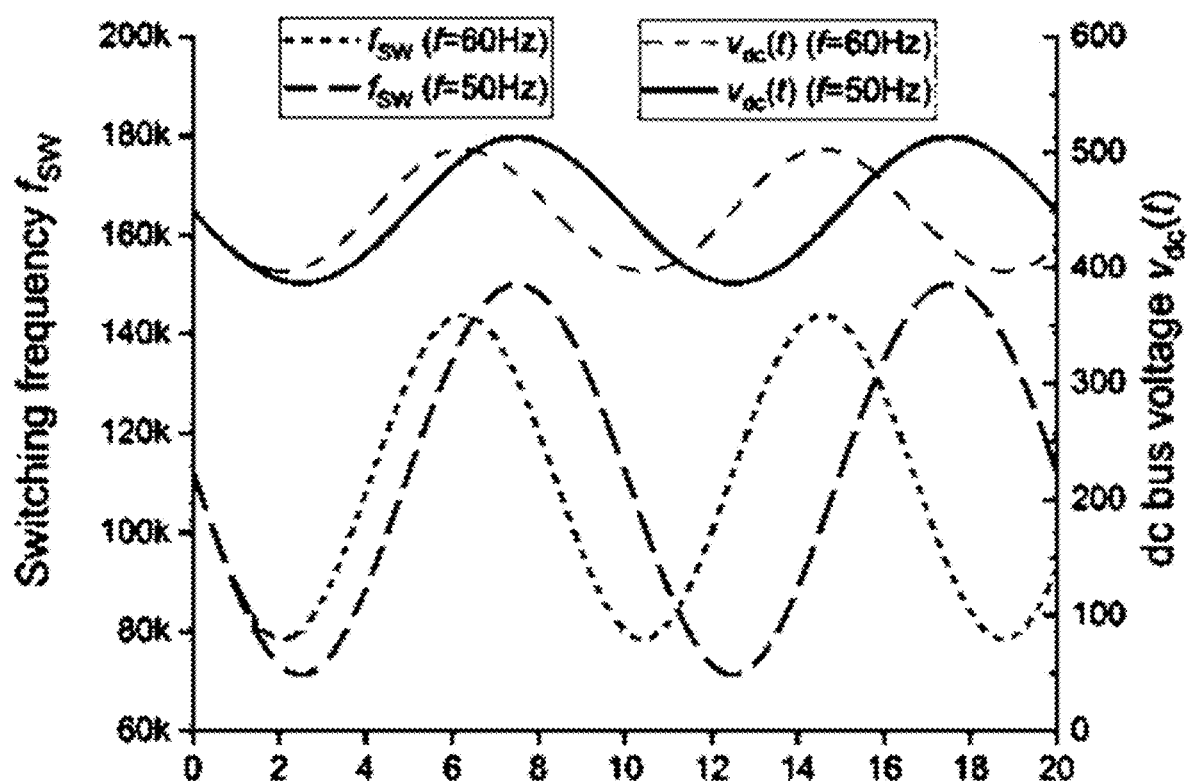
FIG. 5 shows variation between DC bus voltage $v_{dc}(t)$ and switching frequency $f_{SW}$.

FIG. 5 shows variation between DC bus voltage $v_{dc}(t)$ and switching frequency $f_{SW}$.

Figure 8:
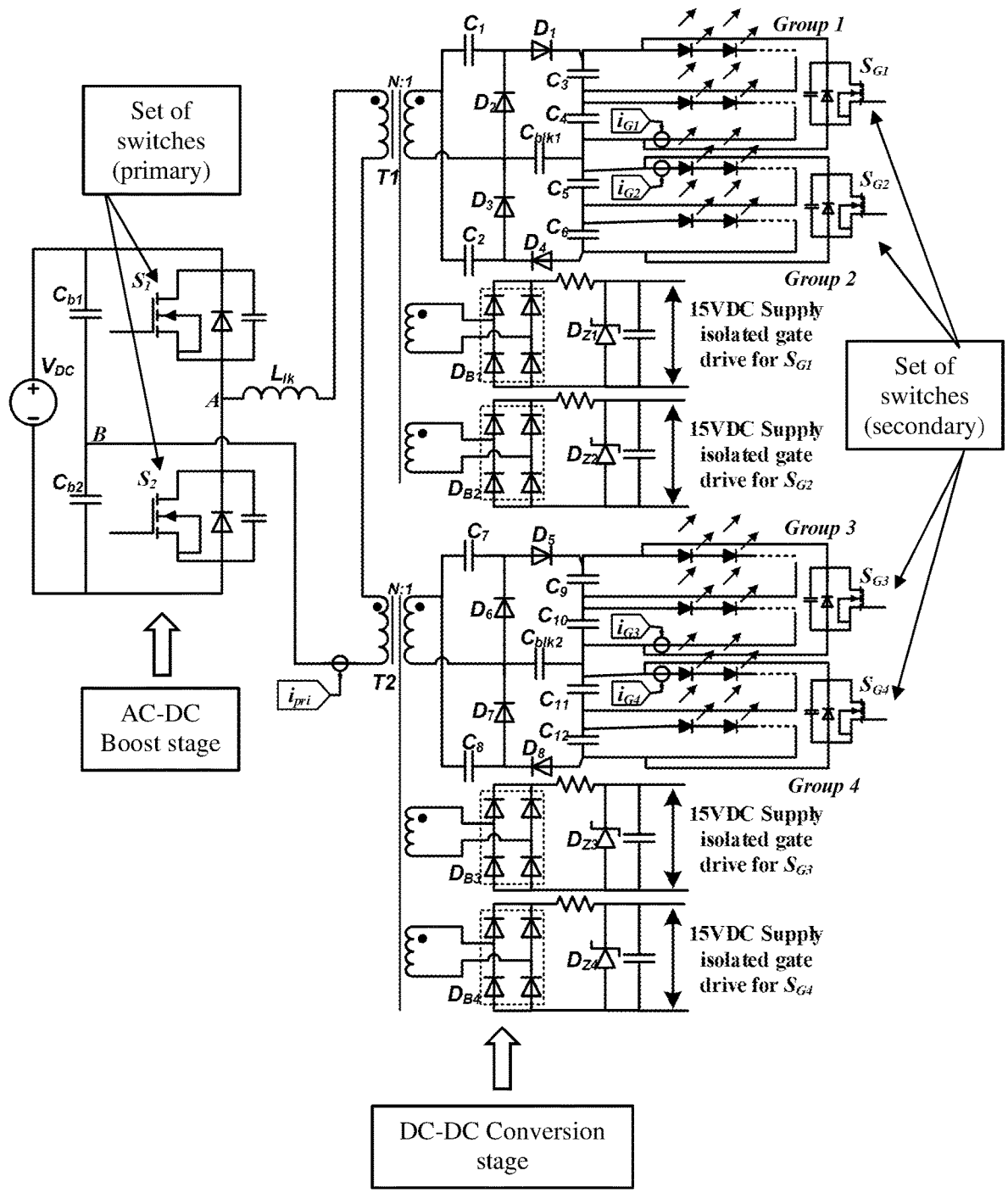
FIG. 8 shows a circuit diagram of a first embodiment according to the present invention.

For the dc-dc converter in FIG. 8, the dc-bus voltage $V_{DC}$ is converted to a high frequency bipolar AV waveform by properly gating ON and OFF the switches S1 and S2 on the primary side of transformers T1 and T2. The transformers T1 and T2 provide galvanic isolation of the output LEDs from the input ac mains.

Energy is transferred from the primary side to the secondary side of the transformers based on charging and discharging of the combined primary side leakage inductor Llk. The symmetric quadrupler rectifiers rectify the secondary side high frequency ac current to drive LED loads. Primary side switches S1 and S2 are used to control the peak value of primary side current $I_{pri,pk}$ by sampling the primary side current $i_{pri}$ of transformers T1 and T2, and hence control the peak current of LEDs. Secondary side switches SG 1-SG 4 aim to control the average currents of each group of LEDs by sampling each group of LED currents iG1-iG4, respectively, to achieve selective dimming. For the secondary side of transformers T1 and T2, the average currents of the groups of LEDs to be dimmed are sensed using resistive sensing and fed back to the controller, which controls the duty ratios of the gating pulses of four secondary side switches SG 1-SG 4 at the frequency $f_{SG}$ (250 Hz). This dimming frequency $f_{SG}$ is higher than the mini-mum recommended frequency of above 160 Hz [30], [31], and much lower than the typical switching frequency $f_{SW}$ (80-160 kHz) of the primary side switches S1 and S2.

The embodiments disclosed herein are exemplary, and the invention encompasses all individual aspects, combinations, subcombinations, and permutations disclosed herein.

REFERENCES

Each patent and other reference is expressly incorporated herein by reference in its entirety. See U.S. Patent and Published Patent application Nos.: U.S. Pat. Nos. 6,111,369; 6,272,025; 6,348,769; 6,369,525; 6,493,242; 6,504,423; 6,507,501; 6,567,281; 6,952,355; 7,282,889; 7,531,984; 7,745,970; 7,992,332; 8,127,477; 8,413,359; 8,587,212; 8,587,217; 8,739,440; 8,739,441; 8,803,366; 9,030,849; 9,107,259; 9,119,244; 9,123,467; 9,192,003; 9,210,749; 9,269,489; 9,282,601; 9,295,117; 9,330,561; 9,351,354; 9,406,220; 9,432,091; 9,526,148; 9,602,010; 9,629,209; 9,648,678; 9,660,520; 9,693,411; 9,723,667; 9,761,370; 9,762,115; 9,769,896; 9,787,195; 9,806,614; 9,825,545; 9,840,159; 9,843,228; 9,844,107; 9,844,108; 9,844,121; 9,844,123; 9,846,752; 9,848,467; 9,853,498; 9,853,550; 9,853,555; 9,853,556; 9,854,640; 9,854,649; 9,859,830; 9,860,946; 9,860,947; 9,863,984; 9,866,124; 9,867,243; 9,868,171; 9,871,438; 9,872,153; 9,872,367; 9,876,692; 9,877,363; 9,882,506; 9,882,606; 9,883,562; 9,887,618; 9,888,533; 9,888,535; 9,888,538; 9,888,540; 9,889,517; 9,893,560; 9,894,727; 9,897,304; 9,897,461; 9,898,026; 9,903,895; 9,906,067; 9,906,137; 9,907,130; 9,909,720; 9,909,901; 9,911,589; 9,912,246; 9,913,320; 9,913,329; 9,913,330; 9,915,908; 9,917,524; 9,923,448; 9,924,571; 9,927,470; 9,927,759; 9,929,640; 9,930,736; 9,931,187; 9,933,842; 9,936,544; 9,936,545; 9,936,551; 9,939,464;

9,939,471; 9,941,803; 9,942,953; 9,942,964; 9,942,969; 9,943,923; 9,946,247; 9,948,100; 9,948,125; 9,948,188; 9,949,328; 9,949,330; 9,952,261; 9,952,568; 9,954,445; 9,958,134; 9,958,146; 9,960,686; 9,961,418; 9,961,728; 9,961,731; 9,961,734; 9,964,982; 9,965,007; 9,967,933; 9,967,940; 9,967,951; 9,970,975; 9,973,036; 9,973,095; 9,974,125; 9,974,129; 9,979,202; 9,979,270; 9,980,330; 9,982,443; 9,985,539; 9,985,627; 9,986,604; 9,986,619; 9,989,618; 9,991,791; 9,991,802; 9,991,821; 9,992,827; 9,992,830; 9,995,815; 9,998,941; RE46715; U.S. Pat. Nos. 10,003,268; 10,006,609; 10,008,857; 10,008,873; 10,008,882; 10,008,910; 10,014,091; 10,014,570; 10,014,771; 10,015,848; 10,015,849; 10,015,851; 10,015,860; 10,015,861; 10,020,677; 10,020,895; 10,027,233; 10,028,340; 10,028,347; 10,028,349; 10,030,863; 10,033,284; 10,033,292; 10,034,338; 10,036,515; 10,037,296; 10,039,171; 10,041,984; 10,044,254; 10,044,518; 10,047,717; 10,048,088; 10,048,123; 10,049,565; 10,050,535; 10,050,552; 10,051,696; 10,051,697; 10,051,698; 10,051,710; 10,058,089; 10,060,957; 10,063,077; 10,064,248; 10,069,398; 10,069,402; 10,070,488; 10,074,997; 10,075,042; 10,075,064; 10,079,551; 10,079,765; 10,082,284; 10,090,777; 10,091,842; 10,091,844; 10,092,007; 10,097,240; 10,098,194; 10,098,195; 10,098,196; 10,099,308; 10,101,716; 10,103,631; 10,104,731; 10,104,732; 10,104,735; 10,110,075; 10,111,290; 10,114,784; 10,116,138; 10,116,239; 10,120,361; 10,122,257; 10,122,259; 10,123,388; 10,128,101; 10,128,740; 10,128,761; 10,128,774; 10,129,961; 10,129,962; 10,135,331; 10,135,361; 10,136,483; 10,136,484; 10,137,520; 10,139,093; 10,141,740; 10,141,770; 10,141,830; 10,143,064; 10,143,070; 10,145,830; 10,148,170; 10,148,175; 10,149,362; 10,149,370; 10,152,068; 10,153,692; 10,153,702; 10,154,551; 10,154,569; 10,154,570; 10,158,282; 10,158,284; 10,159,123; 10,159,125; 10,159,126; 10,159,132; 10,161,616; 10,162,785; 10,163,554; 10,164,513; 10,165,631; 10,168,360; 10,170,999; 10,172,191; 10,172,197; 10,172,199; 10,172,211; 10,172,214; 10,176,764; 10,178,715; 10,178,719; 10,178,720; 10,178,742; 10,181,796; 10,181,798; 10,182,488; 10,187,934; 10,187,946; 10,193,341; 10,193,351; 10,193,467; 10,193,628; 10,194,500; 10,194,501; 10,194,770; 10,205,324; 10,205,381; 10,206,270; 10,211,702; 10,211,742; 10,212,769; 10,217,419; 10,218,218; 10,219,335; 10,224,831; 10,225,901; 10,228,265; 10,230,243; 10,230,296; 10,231,301; 10,236,174; 10,236,772; 10,240,841; 10,241,136; 10,241,322; 10,243,376; 10,243,406; 10,243,472; 10,243,473; 10,243,478; 10,250,071; 10,251,226; 10,255,215; 10,256,712; 10,256,715; 10,257,894; 10,257,897; 10,263,458; 10,263,508; 10,263,510; 10,263,532; 10,264,636; 10,271,390; 10,271,391; 10,271,409; 10,274,573; 10,274,980; 10,275,840; 10,277,114; 10,277,727; 10,278,244; 10,284,096; 10,285,231; 10,286,176; 10,292,223; 20020039298; 20020172056; 20020176263; 20020181250; 20030002303; 20040012986; 20040267501; 20060181242; 20070210724; 20070210748; 20080001695; 20090284164; 20090284165; 20090284179; 20100141162; 20100237799; 20100295471; 20110007525; 20110204820; 20120001563; 20120074861; 20120104956; 20120133299; 20120169230; 20120217892; 20120268021; 20130015776; 20130039104; 20130051088; 20130188397; 20130193846; 20130193852; 20130207468; 20130207601; 20130278076; 20130285565; 20130307436; 20140100801; 20140103813; 20140103828; 20140103829; 20140103838; 20140103899; 20140104831; 20140111091; 20140111113; 20140113828; 20140117865; 20140117868; 20140117878; 20140125228; 20140125230; 20140125234; 20140125241; 20140125244; 20140125248; 20140125252; 20140126174; 20140132172; 20140132179; 20140132184; 20140132210; 20140133156; 20140136178; 20140139112; 20140139117; 20140139142; 20140142731; 20140145594; 20140145595; 20140145596; 20140145597; 20140145598; 20140145599; 20140145600; 20140145601; 20140145602; 20140145603; 20140145604; 20140145605; 20140145606; 20140145607; 20140145608; 20140145617; 20140145618; 20140145619; 20140145620; 20140145621; 20140145637; 20140152012; 20140153291; 20140153292; 20140159584; 20140159585; 20140159605; 20140159608; 20140159615; 20140159648; 20140159652; 20140159692; 20140159693; 20140160801; 20140160802; 20140160807; 20140163761; 20140164803; 20140167634; 20140167639; 20140167649; 20140167652; 20140167974; 20140168567; 20140175866; 20140175898; 20140175997; 20140176008; 20140176017; 20140177304; 20140178845; 20140184080; 20140184087; 20140184093; 20140191624; 20140191659; 20140191683; 20140192527; 20140192562; 20140197751; 20140198337; 20140204614; 20140210352; 20140210358; 20140210362; 20140210369; 20140210377; 20140211345; 20140211518; 20140211519; 20140217910; 20140218008; 20140218978; 20140225449; 20140225515; 20140225521; 20140226370; 20140226371; 20140232270; 20140232282; 20140232284; 20140233269; 20140236372; 20140239810; 20140239830; 20140239831; 20140239832; 20140239833; 20140246924; 20140246976; 20140246988; 20140247117; 20140247148; 20140247152; 20140249825; 20140252954; 20140252955; 20140252973; 20140252990; 20140253011; 20140253032; 20140253090; 20140265834; 20140265844; 20140265859; 20140265885; 20140265899; 20140265900; 20140265901; 20140265909; 20140265912; 20140265913; 20140265916; 20140265932; 20140265935; 20140266389; 20140268888; 20140268918; 20140268941; 20140285097; 20140285102; 20140285103; 20140292215; 20140292229; 20140292288; 20140293601; 20140299715; 20140300274; 20140306614; 20140312706; 20140312707; 20140312796; 20140312797; 20140312804; 20140312806; 20140312969; 20140319916; 20140319917; 20140319932; 20140320008; 20140320009; 20140321057; 20140327308; 20140327992; 20140333226; 20140334134; 20140340943; 20140346874; 20140346896; 20140346960; 20140346962; 20140346973; 20140347039; 20140347903; 20140354048; 20140354155; 20140354156; 20140354170; 20140354172; 20140360713; 20140361627; 20140361697; 20140361698; 20140361700; 20140361701; 20140361703; 20140362583; 20140363169; 20140368109; 20140368114; 20140368215; 20140369083; 20140375203; 20140375276; 20150002032; 20150002043; 20150002044; 20150002049; 20150002050; 20150002068; 20150002137; 20150003115; 20150003122; 20150003123; 20150008826; 20150008827; 20150008828; 20150008831; 20150008844; 20150009722; 20150012145; 20150015145; 20150015149; 20150015153; 20150022087; 20150022176; 20150023064; 20150028753; 20150028761; 20150035442; 20150035449; 20150035450; 20150036389; 20150036401; 20150042228; 20150042231; 20150042314; 20150043252; 20150048758; 20150054414; 20150054417; 20150056107; 20150056567; 20150057821; 20150057822; 20150057827; 20150061503; 20150061516; 20150061521; 20150061522; 20150061524; 20150061534; 20150061569; 20150061614; 20150062975; 20150062977; 20150062978; 20150064278; 20150069831; 20150069924; 20150070946; 20150076999; 20150077003; 20150077009; 20150077016; 20150078041; 20150084544; 20150085537; 20150091448; 20150091456; 20150091457; 20150091458; 20150091459; 20150091460; 20150091462; 20150091465; 20150091466; 20150092458; 20150093453; 20150108905; 20150108912; 20150115800; 20150115815; 20150115822; 20150115824; 20150115838; 20150115839; 20150115845; 20150123484; 20150123554;

20150123573; 20150123600; 20150124426; 20150124437; 20150130363; 20150130372; 20150132006; 20150137687; 20150137690; 20150137691; 20150137693; 20150137694; 20150137707; 20150137859; 20150138847; 20150144424; 20150149617; 20150155789; 20150155860; 20150161298; 20150162833; 20150163879; 20150171742; 20150171757; 20150171760; 20150173134; 20150173145; 20150173153; 20150179098; 20150180325; 20150189068; 20150189707; 20150189710; 20150191840; 20150192337; 20150192346; 20150194883; 20150195878; 20150195883; 20150197868; 20150200599; 20150200601; 20150204497; 20150204561; 20150207421; 20150208469; 20150208472; 20150208474; 20150208479; 20150214746; 20150222178; 20150222189; 20150223303; 20150226583; 20150229357; 20150230300; 20150230304; 20150231408; 20150236546; 20150236581; 20150237689; 20150237700; 20150237702; 20150244121; 20150244272; 20150244273; 20150245438; 20150248510; 20150249397; 20150252970; 20150255994; 20150256091; 20150257223; 20150257226; 20150260384; 20150263627; 20150263638; 20150263646; 20150264755; 20150264758; 20150264761; 20150264762; 20150264769; 20150264780; 20150270719; 20150271883; 20150280592; 20150282262; 20150282264; 20150288225; 20150289332; 20150294572; 20150295413; 20150295500; 20150303787; 20150303792; 20150303796; 20150303812; 20150303813; 20150303898; 20150305101; 20150305104; 20150305110; 20150305112; 20150305120; 20150309951; 20150309952; 20150311803; 20150311808; 20150312974; 20150312983; 20150312986; 20150312989; 20150318685; 20150318704; 20150318772; 20150318787; 20150318796; 20150319817; 20150319820; 20150326008; 20150326117; 20150326131; 20150326152; 20150331436; 20150333630; 20150333638; 20150333764; 20150334780; 20150334781; 20150334782; 20150334783; 20150334784; 20150338862; 20150340955; 20150340957; 20150341996; 20150349535; 20150351175; 20150351180; 20150351184; 20150351188; 20150351205; 20150357831; 20150357899; 20150357908; 20150357910; 20150359066; 20150362941; 20150365003; 20150365004; 20150366013; 20150366033; 20150372586; 20150373796; 20150373811; 20150380927; 20150380982; 20150381054; 20150382413; 20150382429; 20160006361; 20160007417; 20160014850; 20160014861; 20160014865; 20160020691; 20160021713; 20160028243; 20160029450; 20160029451; 20160029625; 20160043569; 20160043571; 20160049881; 20160056664; 20160056725; 20160057822; 20160057824; 20160057825; 20160057826; 20160065051; 20160066379; 20160072378; 20160072551; 20160073455; 20160073456; 20160073457; 20160073460; 20160073463; 20160073471; 20160076743; 20160079872; 20160087523; 20160087535; 20160087537; 20160087687; 20160088698; 20160098046; 20160105936; 20160105941; 20160111876; 20160113083; 20160113086; 20160118792; 20160118901; 20160119987; 20160119990; 20160119992; 20160126846; 20160126860; 20160126949; 20160127875; 20160131686; 20160134187; 20160134188; 20160134189; 20160134194; 20160134196; 20160134197; 20160135267; 20160139548; 20160141951; 20160141964; 20160143097; 20160143104; 20160143108; 20160146868; 20160149500; 20160150604; 20160150609; 20160150612; 20160150613; 20160150620; 20160156269; 20160156275; 20160157313; 20160164291; 20160165684; 20160165685; 20160165686; 20160165688; 20160172981; 20160172985; 20160174310; 20160174311; 20160181918; 20160181927; 20160183351; 20160187449; 20160190927; 20160190939; 20160190941; 20160192448; 20160195864; 20160196375; 20160197478; 20160197489; 20160198532; 20160198541; 20160202116; 20160204652; 20160204692; 20160205733; 20160205735; 20160211759; 20160211841; 20160212816; 20160216662; 20160216663; 20160218524; 20160218626; 20160223588; 20160224048; 20160227614; 20160227615; 20160230767; 20160234899; 20160246904; 20160246907; 20160248250; 20160248323; 20160252367; 20160261123; 20160261199; 20160268841; 20160270169; 20160270174; 20160276936; 20160276949; 20160278171; 20160278180; 20160278639; 20160286612; 20160286618; 20160286635; 20160294227; 20160295653; 20160301253; 20160302266; 20160302268; 20160308367; 20160308370; 20160308374; 20160309557; 20160313744; 20160316530; 20160316533; 20160322910; 20160323943; 20160323945; 20160323947; 20160323953; 20160323955; 20160329722; 20160329745; 20160330808; 20160335220; 20160336812; 20160336861; 20160336864; 20160338159; 20160338163; 20160349295; 20160352210; 20160356837; 20160358553; 20160362015; 20160363308; 20160365731; 20160365799; 20160366732; 20160366733; 20160366734; 20160366735; 20160366743; 20160368392; 20160370204; 20160372970; 20160374164; 20160374168; 20160375058; 20160380441; 20160380476; 20160380516; 20160380528; 20160380545; 20160381745; 20160381756; 20170005652; 20170006681; 20170006683; 20170006688; 20170007060; 20170012562; 20170013417; 20170013683; 20170013688; 20170013690; 20170016598; 20170016603; 20170016610; 20170017600; 20170019963; 20170019964; 20170019967; 20170025962; 20170026189; 20170027029; 20170027043; 20170027168; 20170034879; 20170040799; 20170041996; 20170042004; 20170045571; 20170046458; 20170047859; 20170048937; 20170053736; 20170053737; 20170054306; 20170055321; 20170062124; 20170063215; 20170063242; 20170068233; 20170070162; 20170070180; 20170071039; 20170071043; 20170077703; 20170077798; 20170078109; 20170078110; 20170078906; 20170079095; 20170079099; 20170083043; 20170083062; 20170085153; 20170089192; 20170090396; 20170095286; 20170099710; 20170105255; 20170105265; 20170105266; 20170105391; 20170111086; 20170111965; 20170111977; 20170117748; 20170117806; 20170117813; 20170117814; 20170118809; 20170118812; 20170118814; 20170122542; 20170125892; 20170126016; 20170127485; 20170127493; 20170133886; 20170141688; 20170142794; 20170149285; 20170149342; 20170150566; 20170154739; 20170156780; 20170164439; 20170164440; 20170167744; 20170168034; 20170171937; 20170176581; 20170179808; 20170179823; 20170182895; 20170184640; 20170187292; 20170187294; 20170187836; 20170188422; 20170188425; 20170188426; 20170188429; 20170188430; 20170189640; 20170192398; 20170196056; 20170196059; 20170196063; 20170199265; 20170201129; 20170201161; 20170202062; 20170207695; 20170208656; 20170208659; 20170212399; 20170214322; 20170215240; 20170215256; 20170215295; 20170220505; 20170222720; 20170223795; 20170228479; 20170228653; 20170229051; 20170229897; 20170231058; 20170232122; 20170237254; 20170238377; 20170238379; 20170238380; 20170238381; 20170238382; 20170238386; 20170238401; 20170245339; 20170245341; 20170245350; 20170250620; 20170256944; 20170257919; 20170257928; 20170261910; 20170263374; 20170265259; 20170270069; 20170271979; 20170279287; 20170279300; 20170279367; 20170280523; 20170288466; 20170288557; 20170290113; 20170290114; 20170299444; 20170300107; 20170302200; 20170303353; 20170309232; 20170310224; 20170311396; 20170311397; 20170311400; 20170311401; 20170311409; 20170318631; 20170318633; 20170325299; 20170331364; 20170332453; 20170346345; 20170346386; 20170346413; 20170347173; 20170348350; 20170353097; 20170353100; 20170358441; 20170358989; 20170359874; 20170359880; 20170366022; 20170366029; 20170366099; 20170367345; 20170373496;

20180003746; 20180004240; 20180007751; 20180007766; 20180013349; 20180013351; 20180020516; 20180020521; 20180023788; 20180026521; 20180026523; 20180026550; 20180027386; 20180027630; 20180034268; 20180034446; 20180035500; 20180035503; 20180042075; 20180046208; 20180048239; 20180049289; 20180059175; 20180062503; 20180062551; 20180063910; 20180078072; 20180083529; 20180083539; 20180084616; 20180091041; 20180092167; 20180092190; 20180101500; 20180103411; 20180103520; 20180103529; 20180110099; 20180110101; 20180112837; 20180115168; 20180116017; 20180116034; 20180122567; 20180123351; 20180123442; 20180123464; 20180124890; 20180132318; 20180139811; 20180145583; 20180145599; 20180146522; 20180149349; 20180152110; 20180153008; 20180153010; 20180153014; 20180153020; 20180156394; 20180157284; 20180159432; 20180162229; 20180184493; 20180187877; 20180191237; 20180191930; 20180192478; 20180192488; 20180198371; 20180199782; 20180205315; 20180210012; 20180210023; 20180213621; 20180213687; 20180217205; 20180217658; 20180219481; 20180220506; 20180224922; 20180228001; 20180233911; 20180234019; 20180235043; 20180235047; 20180238531; 20180238942; 20180238955; 20180242437; 20180243062; 20180243527; 20180248472; 20180248760; 20180249539; 20180249543; 20180255626; 20180260352; 20180262013; 20180262102; 20180263087; 20180263096; 20180266125; 20180269013; 20180270925; 20180278071; 20180279429; 20180279431; 20180279437; 20180287522; 20180288845; 20180295692; 20180301931; 20180302967; 20180331603; 20180336152; 20180343057; 20180343718; 20180351447; 20180358893; 20180358894; 20180359828; 20180367029; 20180368225; 20180373824; 20180373827; 20180376556; 20190005165; 20190006940; 20190008008; 20190008011; 20190008012; 20190008022; 20190013960; 20190020210; 20190020264; 20190020270; 20190021154; 20190025348; 20190025363; 20190029086; 20190032864; 20190035569; 20190036456; 20190041008; 20190041920; 20190044432; 20190044433; 20190044434; 20190044505; 20190045593; 20190052175; 20190052176; 20190053350; 20190056803; 20190058393; 20190059386; 20190063702; 20190064133; 20190065973; 20190067958; 20190069361; 20190069364; 20190069370; 20190072596; 20190073331; 20190075629; 20190075630; 20190076033; 20190081565; 20190089254; 20190090330; 20190097448; 20190097539; 20190097542; 20190098721; 20190098723; 20190098725; 20190101967; 20190103750; 20190104583; 20190109891; 20190115837; 20190115979; 20190116636; 20190116651; 20190123094; 20190124740; 20190132055; 20190132815; 20190140554; 20190140556; 20190141804; 20190141822; 20190143119; 20190149051; and 20190149761.

See also, WO2012/119244; WO2014/0798998; EP236717; JP2004-235123; JP2006-262640; JP2013-162649; and JP2013235848.

[1] J. Zhao, "Greenhouse gas abatement analysis of the energy saving retrofit in pulverized coal power plants," in Power and Energy Engineering Conference (APPEEC), 2010 Asia-Pacific, 2010, pp. 1-4: IEEE.

[2] W. Zghal, G. Kantchev, and H. Kchaou, "Determination of the exploitable solar energy for electricity generation using the photovoltaic systems," in Renewable Energies and Vehicular Technology (REVET), 2012 First International Conference on, 2012, pp. 43-48: IEEE.

[3] S. Mukherjee, "Opportunities and challenges with net zero energy buildings," in Power Semiconductor Devices and ICs (ISPSD), 2011 IEEE 23rd International Symposium on, 2011, pp. 1-5: IEEE.

[4] Cree LED datasheet. Available: www.cree.com/led-components/media/documents/ds-XBD.pdf

[5] Compact fluorescent lamp (CFL) wikipedia. Available: en.wikipedia.org/wiki/Compact_fluorescent_lamp

[6] G.-S. Seo, H.-J. Kim, K.-C. Lee, S.-J. Choi, and B.-H. Cho, "DC-Level Dimmable LED Driver With Primary Side On-Time Control for DC Distribution," IEEE Journal of Emerging and Selected Topics in Power Electronics, vol. 3, no. 3, pp. 624-632, 2015.

[7] C.-L. Chu, T.-L. Chiu, and K.-H. Chen, "Pseudo zero-dimension dimming for power reduction in field sequential color liquid crystal display systems," Journal of Display Technology, vol. 6, no. 8, pp. 323-331, 2010.

[8] S.-Y. Wang, C.-L. Tseng, S.-C. Lin, S.-C. Wang, C.-L. Chen, and J.-H. Chou, "Design and implementation of a single-stage high-efficacy LED driver with dynamic voltage regulation," in Systems, Man, and Cybernetics (SMC), 2013 IEEE International Conference on, 2013, pp. 1438-1443: IEEE.

[9] L. Yu, Y. Zhu, M. Chen, and T. Yoshihara, "High efficiency multi-channel LED driver based on SIMO switch-mode converter," in SoC Design Conference (ISOCC), 2012 International, 2012, pp. 483-486: IEEE.

[10] A. Zhao and W. T. Ng, "An energy conservation based high-efficiency dimmable multi-channel LED driver," in Energy Conversion Congress and Exposition (ECCE), 2011 IEEE, 2011, pp. 2576-2580: IEEE.

[11] A. T. Lee, J. K. Sin, and P. C. Chan, "Scalability of quasi-hysteretic FSM-based digitally controlled single-inductor dual-string buck LED driver to multiple strings," IEEE transactions on power electronics, vol. 29, no. 1, pp. 501-513, 2014.

[12] J. Hasan and S. S. Ang, "A high-efficiency digitally controlled RGB driver for LED pixels," IEEE Transactions on Industry Applications, vol. 47, no. 6, pp. 2422-2429, 2011.

[13] Z.-Z. Yang, Y.-H. Liu, P.-Y. Chen, and J.-W. Huang, "Sequential-color voltage-adaptable RGB-LED backlight driving system with local dimming control for LCD panels," in Power Electronics and Drive Systems, 2009. PEDS 2009. International Conference on, 2009, pp. 1542-1546: IEEE.

[14] J. Liu, W. Sun, and J. Zeng, "Precise current sharing control for multi-channel LED driver based on switch-controlled capacitor," IET Power Electronics, vol. 10, no. 3, pp. 357-367, 2017.

[15] J. Zhang, T. Jiang, and X. Wu, "A High-Efficiency Quasi-Two-Stage LED Driver With Multichannel Outputs," IEEE Transactions on Industrial Electronics, vol. 64, no. 7, pp. 5875-5882, 2017.

[16] T. Jiang, J. Zhang, K. Sheng, and Z. Qian, "High-efficiency quasi-two-stage converter with current sharing for multi-channel LED driver," in Future Energy Electronics Conference (IFEEC), 2013 1st International, 2013, pp. 311-315: IEEE. [17] R. Kathiresan, P. Das, T. Reindl, and S. K. Panda, "A Novel High Power Non-Resonant Multi-Channel LED Driver," IEEE Transactions on Industrial Electronics, vol. 64, no. 7, pp. 5851-5864, July 2017.

[18] Pulsed Over-Current Driving of Cree Xlamp LEDs: Information and Cautions. Available: www.cree.com/led-components/media/documents/XLampPulsedCurrent.pdf

[19] J. Fan, K.-C. Yung, and M. Pecht, "Lifetime estimation of high-power white LED using degradation-data-driven method," IEEE Transactions on Device and Materials Reliability, vol. 12, no. 2, pp. 470-477, 2012.

[20] B. Sun, X. Fan, C. Qian, and G. Zhang, "PoF-simulation-assisted reliability prediction for electrolytic capacitor in LED drivers," IEEE Transactions on Industrial Electronics, vol. 63, no. 11, pp. 6726-6735, 2016.

[21] H. Ma, C. Zheng, W. Yu, B. Gu, J.-S. J. Lai, and Q. Feng, "Bridgeless electrolytic capacitor-less valley-fill AC/DC converter for offline twin-bus light-emitting diode lighting application," IET Power Electronics, vol. 6, no. 6, pp. 1132-1141, 2013.

[22] H. Ma, J.-S. Lai, Q. Feng, W. Yu, C. Zheng, and Z. Zhao, "A novel valley-fill SEPIC-derived power supply without electrolytic capacitor for LED lighting application," IEEE Transactions on Power Electronics, vol. 27, no. 6, pp. 3057-3071, 2012.

[23] S. Wang, X. Ruan, K. Yao, S.-C. Tan, Y. Yang, and Z. Ye, "A flicker-free electrolytic capacitor-less AC-DC LED driver," IEEE Transactions on Power Electronics, vol. 27, no. 11, pp. 4540-4548, 2012.

[24] Y. Yang, X. Ruan, L. Zhang, J. He, and Z. Ye, "Feedforward scheme for an electrolytic capacitor-less AC/DC LED driver to reduce output current ripple," IEEE Transactions on Power Electronics, vol. 29, no. 10, pp. 5508-5517, 2014.

[25] J. He, X. Ruan, and L. Zhang, "Adaptive Voltage Control for Bidirectional Converter in Flicker-Free Electrolytic Capacitor-Less AC-DC LED Driver," IEEE Transactions on Industrial Electronics, vol. 64, no. 1, pp. 320-324, 2017.

[26] Y. Qiu, L. Wang, H. Wang, Y.-F. Liu, and P. C. Sen, "Bipolar ripple cancellation method to achieve single-stage electrolytic-capacitor-less high-power LED driver," IEEE Journal of Emerging and Selected Topics in Power Electronics, vol. 3, no. 3, pp. 698-713, 2015.

[27] P. Fang, Y.-F. Liu, and P. C. Sen, "A flicker-free single-stage offline LED driver with high power factor," IEEE Journal of Emerging and Selected Topics in Power Electronics, vol. 3, no. 3, pp. 654-665, 2015.

[28] H. Valipour, G. Rezazadeh, and M. R. Zolghadri, "Flicker-free electrolytic capacitor-less universal input offline LED driver with PFC," IEEE Transactions on Power Electronics, vol. 31, no. 9, pp. 6553-6561, 2016.

[29] H. Dong, X. Xie, L. Jiang, Z. Jin, and X. Zhao, "An Electrolytic Capacitor-Less High Power Factor LED Driver Based on a "One-and-a-Half Stage" Forward-Flyback Topology," IEEE Transactions on Power Electronics, vol. 33, no. 2, pp. 1572-1584, 2018.

[30] P. Fang and Y.-F. Liu, "Energy Channeling LED Driver Technology to Achieve Flicker-Free Operation With True Single Stage Power Factor Correction," IEEE Transactions on Power Electronics, vol. 32, no. 5, pp. 3892-3907, 2017.

[31] P. Fang, Y.-j. Qiu, H. Wang, and Y.-F. Liu, "A Single-Stage Primary-Side-Controlled Off-line Flyback LED Driver With Ripple Cancellation," IEEE Transactions on Power Electronics, vol. 32, no. 6, pp. 4700-4715, 2017.

[32] F. Wang, L. Li, Y. Zhong, and X. Shu, "Flyback-Based Three-Port Topologies for Electrolytic Capacitor-Less LED Drivers," IEEE Transactions on Industrial Electronics, vol. 64, no. 7, pp. 5818-5827, 2017.

[33] D. G. Lamar, M. Arias, A. Fernandez, J. A. Villarejo, and J. Sebastian, "Active Input Current Shaper Without an Electrolytic Capacitor for Retrofit Lamps Applications," IEEE Transactions on Power Electronics, vol. 32, no. 5, pp. 3908-3919, 2017.

[34] J. C. Lam and P. K. Jain, "Isolated AC/DC offline high power factor single-switch LED drivers without electrolytic capacitors," IEEE Journal of Emerging and Selected Topics in Power Electronics, vol. 3, no. 3, pp. 679-690, 2015.

[35] W. Chen and S. R. Hui, "Elimination of an electrolytic capacitor in AC/DC light-emitting diode (LED) driver with high input power factor and constant output current," IEEE Transactions on Power Electronics, vol. 27, no. 3, pp. 1598-1607, 2012.

[36] B. Poorali and E. Adib, "Analysis of the integrated SEPIC-flyback converter as a single-stage single-switch power-factor-correction LED driver," IEEE Transactions on Industrial Electronics, vol. 63, no. 6, pp. 3562-3570, 2016.

[37] Z. Shan, X. Chen, J. J. GAE, and K. T. Chi, "An AC-DC LED Driver with an Additional Active Rectifier and a Unidirectional Auxiliary Circuit for AC Power Ripple Isolation," IEEE Transactions on Power Electronics, 2018.

[38] H. Wu, S.-C. Wong, K. T. Chi, S. R. Hui, and Q. Chen, "Single-Phase LED Drivers With Minimal Power Processing, Constant Output Current, Input Power Factor Correction, and Without Electrolytic Capacitor," IEEE Transactions on Power Electronics, vol. 33, no. 7, pp. 6159-6170, 2018.

[39] G. M. Soares, P. S. Almeida, J. M. Alonso, and H. A. Braga, "Capacitance minimization in offline LED drivers using an active-ripple-compensation technique," IEEE Transactions on Power Electronics, vol. 32, no. 4, pp. 3022-3033, 2017.

[40] D. Camponogara, D. R. Vargas, M. A. Dalla Costa, J. M. Alonso, J. Garcia, and T. Marchesan, "Capacitance reduction with an optimized converter connection applied to LED drivers," IEEE Transactions on Industrial Electronics, vol. 62, no. 1, pp. 184-192, 2015.

[41] F. Zhang, J. Ni, and Y. Yu, "High power factor AC-DC LED driver with film capacitors," IEEE Transactions on Power Electronics, vol. 28, no. 10, pp. 4831-4840, 2013.

[42] J. Lam, N. El-Taweel, and M. Abbasi, "An Output-Current-Dependent DC-Link Energy Regulation Scheme for a Family of Soft-Switched AC/DC Offline LED Drivers Without Electrolytic Capacitors," IEEE Transactions on Industrial Electronics, vol. 64, no. 7, pp. 5838-5850, 2017.

[43] P. S. Almeida, H. A. Braga, M. A. Dalla Costa, and J. M. Alonso, "Offline soft-switched LED driver based on an integrated bridgeless boost-asymmetrical half-bridge converter," IEEE Transactions on Industry Applications, vol. 51, no. 1, pp. 761-769, 2015.

[44] H. Ma, J.-S. J. Lai, C. Zheng, and P. Sun, "A high-efficiency quasi-single-stage bridgeless electrolytic capacitor-free high-power AC-DC driver for supplying multiple LED strings in parallel," IEEE Transactions on Power Electronics, vol. 31, no. 8, pp. 5825-5836, 2016.

[45] H. Ma, G. Chen, J. H. Yi, Q. W. Meng, L. Zhang, and J. P. Xu, "A single-stage PFM-APWM hybrid modulated soft-switched converter with low bus voltage for high-power LED lighting applications," IEEE Transactions on Industrial Electronics, vol. 64, no. 7, pp. 5777-5788, 2017.

[46] S. Pervaiz, A. Kumar, and K. K. Afridi, "A Compact Electrolytic-Free Two-Stage Universal Input Offline LED Driver with Volume Optimized SSC Energy Buffer," IEEE Journal of Emerging and Selected Topics in Power Electronics, 2018.

[47] X. Qu, S.-C. Wong, and K. T. Chi, "Noncascading structure for electronic ballast design for multiple LED lamps with independent brightness control," IEEE transactions on Power Electronics, vol. 25, no. 2, pp. 331-340, 2010.

[48] M. Arias, D. G. Lamar, J. Sebastian, D. Balocco, and A. A. Diallo, "High-efficiency LED driver without electrolytic capacitor for street lighting," IEEE Transactions on Industry Applications, vol. 49, no. 1, pp. 127-137, 2013.

[49] M. Arias, M. F. Diaz, D. G. Lamar, D. Balocco, A. A. Diallo, and J. Sebastian, "High-efficiency asymmetrical half-bridge converter without electrolytic capacitor for low-output-voltage AC-DC LED drivers," IEEE Transactions on Power Electronics, vol. 28, no. 5, pp. 2539-2550, 2013.

[50] M. Arias, I. Castro, D. G. Lamar, A. Vazquez, and J. Sebastian, "Optimized design of a high input-voltage-ripple-rejection converter for LED lighting," IEEE Transactions on Power Electronics, vol. 33, no. 6, pp. 5192-5205, 2018.

[51] E. Mujjalinvimut, P. N. N. Ayudhya, and A. Sangswang, "An improved asymmetrical half-bridge converter with self-driven synchronous rectifier for dimmable LED lighting," IEEE Transactions on Industrial Electronics, vol. 63, no. 2, pp. 913-925, 2016.

[53] Y. Zhao, X. Xiang, W. Li, X. He, and C. Xia, "Advanced symmetrical voltage quadrupler rectifiers for high step-up and high output-voltage converters," IEEE Transactions on Power Electronics, vol. 28, no. 4, pp. 1622-1631, 2013.

[54] Cree LED datasheet. Available: www.cree.com/led-components/media/d.ocuments/ds-XBD.pdf

[55] Y. Guo, S. Li, A. T. Lee, S.-C. Tan, C. K. Lee, and S. R. Hui, "Single-stage AC/DC single-inductor multiple-output LED drivers," IEEE Trans. Power Electron., vol. 31, no. 8, pp. 5837-5850[56] S. Li, Y. Guo, S.-C. Tan, and S. R. Hui, "An off-line single-inductor multiple-output LED driver with high dimming precision and full dimming range," IEEE Trans. Power Electron., vol. 32, no. 6, pp. 4716-4727, June 2017.

[57] T. Ching, "Modular dimmable light-emitting-diode driver for general illumination applications," in Proc. 23rd Can. Conf. Elect. Comput. Eng., 2010, pp. 1-4.

[58] T. Ching, "Transition-mode dimmable LED driver for illumination applications," in Proc. Int. Power Electron. Conf., 2010, pp. 398-402.

[59] A. Jha and B. Singh, "Bridgeless ZETA PFC converter for low voltage high current LED driver," in Proc. 6th Int. Conf. Comput. Appl. Elect. Eng.-Recent Advances, 2017, pp. 539-544.

[60] A. Jha and B. Singh, "Power quality improvement using bridgeless Landsman converter for LED driver," IET Power Electron., vol. 9, no. 13, pp. 2591-2601, 2016.

[61] W. Chen and S. Hui, "A dimmable light-emitting diode (LED) driver with mag-amp postregulators for multistring applications," IEEE Trans. Power Electron., vol. 26, no. 6, pp. 1714-1722, June 2011.

[62] C.-C. Chen, C.-Y. Wu, and T.-F. Wu, "Fast transition current-type burstmode dimming control for the LED back-light driving system of LCD TV," in Proc. 37th IEEE Power Electron. Specialists Conf., 2006, pp. 1-7.

[63] R. A. Pinto, J. M. Alonso, M. S. Perdigaõ, M. F. da Silva, and R. N. do Prado, "A new technique to equalize branch currents in multiarray LED lamps based on variable inductors," IEEE Trans. Ind. Appl., vol. 52, no. 1, pp. 521-530, January/February 2016.

[64] J. M. Alonso, M. S. Perdigaõ, M. A. Dalla Costa, G. Martinez, and R. Osorio, "Analysis and experiments on a single-inductor half-bridge LED driver with magnetic control," IEEE Trans. Power Electron., vol. 32, no. 12, pp. 9179-9190, December 2017.

[65] C. Wong, K. Loo, H. H.-C. lu, Y. Lai, M. H. Chow, and K. T. Chi, "Independent control of multicolor-multistring LED lighting systems with fully switched-capacitor-controlled LCC resonant network," IEEE Trans. Power Electron., vol. 33, no. 5, pp. 4293-4305, May 2018.

[66] UL 8750 Standard for Light Emitting Diode (LED) Equipment for Use in Lighting Products, 2015. [Online]. Available: standardscatalog.ul.com/standards/en/standard_8750_2

[67] Philips Advance Xitanium LED Driver XI040C070V056CNJ1, 2014. [Online]. Available: www-.na.mytechnologyportallighting.philips.com/dam/file: fb37c43a-189a-4ea9-854f-fa7d09027314/Philips %20Adva nce %20Xitanium %2040 W %200.70A %2054V %20Outdoor %20LED % 20Driver %20with %200-10V %20Dimming %20Datasheet.pdf

[68] S. Li, S.-C. Tan, C. K. Lee, E. Waffenschmidt, S. R. Hui, and K. T. Chi, "A survey, classification, and critical review of light-emitting diode drivers," IEEE Trans. Power Electron., vol. 31, no. 2, pp. 1503-1516, February 2016.

[69] H. Wu, S. Ji, F. C. Lee, and X. Wu, "Multi-channel constant current (MC3) LLC resonant LED driver," in Proc. IEEE Energy Conyers. Congr. Expo., 2011, pp. 2568-2575.

W. Feng, F. C. Lee, and P. Mattavelli, "Optimal trajectory control of LLC resonant converters for LED PWM dimming," IEEE Trans. Power Electron., vol. 29, no. 2, pp. 979-987, February 2014.

A. Wilkins, J. Veitch, and B. Lehman, "LED lighting flicker and potential health concerns: IEEE standard PAR1789 update," in Proc. IEEE Energy Conyers. Congr. Expo., 2010, pp. 171-178.

K. Modepalli and L. Parsa, "Dual-purpose offline LED driver for illumination and visible light communication," IEEE Trans. Ind. Appl., vol. 51, no. 1, pp. 406-419, January/February 2015.

X. Wu, J. Zhang, and Z. Qian, "A simple two-channel LED driver with automatic precise current sharing," IEEE Trans. Ind. Electron., vol. 58, no. 10, pp. 4783-4788, October 2011.

TABLE II

COMPARISON OF THE EXISTING LED DRIVERS FOR N GROUPS OF SELECTIVE DIMMING

| Reference | Topology for isolation | LED channels | Components on transformer isolated secondary side for LED power strings | | | | | Secondary windings | Dimming method | PWM dimming frequency | DC bus input Voltage | Output power |
|---|---|---|---|---|---|---|---|---|---|---|---|---|
| | | | Switch | Diode | Inductor | Capacitor | Transformer | | | | | |
| [7] | Flyback | N | N | N + 1 | N | N + 1 | 1 | 2 | PWM | 240 Hz | / | 20 W |
| [8] | Flyback | N | N | 1 | 1 | 2 | 1 | 2 | PWM | 333 Hz | / | 40 W |
| [9], [10] | Flyback | 3N | 2N | 1 | N | N + 1 | 1 | 2 | AM | / | 300 V | 300 W |

TABLE II-continued

COMPARISON OF THE EXISTING LED DRIVERS FOR N GROUPS OF SELECTIVE DIMMING

| Ref | Type | | | | | | | | Modulation | Frequency | Voltage | Power |
|---|---|---|---|---|---|---|---|---|---|---|---|---|
| [11] | Forward | N | N | 2N + 2 | 2N + 1 | N + 1 | 1 | 2 | AM/PWM | 200 Hz | 20-30 V | 16.5 W |
| [12] | Forward | N | N | N − 1 | N/3 | 2N/3 | 1 | N/3 | PWM | 60 Hz | 400 V | 30 W |
| [13] | Forward | N | 0 | 2N | 2N | N | 1 | N | AM | / | 48 V | 54.4 W |
| [14] | No-resonant | N | 0 | 2N | N | N | N | 1N | AM | / | 380 V | 50 W |
| [15] | Resonant | 1N | N | 4N | N | 4N | 1 | N | AM | / | 43 V | 20 W |
| [16] | Resonant | N | | 4N | 1 | 5N + 2 | 1 | 1 | AM/PWM | 300 Hz | 400 V | 60 W |
| [17] | Resonant | N | N | N + 4 | N | N + 2 | 1 | 2 | AM/PWM | Unspecified | 400 V | 80 W |
| [18] | Resonant | N | 2N | N + 4 | N | N + 2 | 1 | 2 | AM/PWM | 200 Hz | 400 V | 100 W |
| Proposed | Non-resonant | 2N | N | 2N | 0 | 7N/2 | 2 | N/2 | AM/PWM | 250 Hz | 400 V | 150 W |

| Reference | Maximum efficiency AC-DC system | Maximum efficiency Isolated DC-DC | Note |
|---|---|---|---|
| [7] | / | / | Additional buckboost stage including related control and sensing of each channel for selective dimming |
| [8] | >90% | / | Uncontrollable current amplitude in LEDs during selective dimming |
| [9], [10] | >90% | / | Uncontrollable current amplitude in LEDs; additional buck stage for selective dimming |
| [11] | / | 88% | Magnetic-amplifier post-regulator for current balancing amongst different channels. |
| [12] | / | / | Magnetic amplifier control for current balancing; deviation inductor applied with ER-28 core for each group of interleaved three-channel PWM dimming. |
| [13] | / | 86% | Secondary side variable inductors with high loss, instead of switches, to control each group LED current; lower efficiency with increased selectively dimming groups of LEDs; not suitable for low-power applications. |
| [14] | / | 90.5% | Primary side variable inductors with high loss to control each group current of LEDs; lower efficiency with increased power due to higher variable inductor loss; only 85% efficiency at 50 W. |
| [15] | / | 92.4% | Switch-controlled capacitors at each secondary side winding for selective dimming/current balancing. |
| [16] | / | 85.5% | Switch-controlled capacitors for selective dimming and current balancing; one secondary side winding with parallel connected LED strings requires fall-bridge rectifier and two switches with low efficiency for each LED string. |
| [17] | 92% | / | Twin bus output topology; additional buck-boost stage controlled by IC MP4601 of each channel for current balancing; another switch of each channel for selective dimming. |
| [18] | 87.5% | / | Additional buck stage controlled by IC LT1510 of each channel for selective dimming. |
| Proposed | 94.3% | 97.5% | ZVS of primary side switches; ZCS of secondary side rectifier diodes; passive rectifiers to achieve current balancing; only one additional low frequency switched device required of each group of LEDs for selective dimming. |

What is claimed is:

1. A driver circuit for light emitting diodes (LEDs), comprising:
   an input configured to receive an alternating current input;
   an AC-DC boost stage, having a set of switches, and being configured to produce a load-dependent instantaneous ripple voltage;
   a DC-DC power conversion stage having a set of switches;
   a capacitor coupling the AC-DC boost stage and the DC-DC power conversion stage; and
   a controller configured to control:
     the set of switches in the AC-DC boost stage to provide power to the DC-DC power conversion stage, while limiting a peak LED current, and
     the set of switches in the DC-DC power conversion stage to selectively pulse-width modulate an average LED current, to thereby control an LED brightness, a pulse width modulation frequency of the DC-DC power conversion stage being dependent on the load and the instantaneous ripple voltage,
   wherein the set of switches in the AC-DC boost stage and the set of switches in the DC-DC power conversion stage are each controlled to switch at zero voltage; and
   an output configured to supply power to the LEDs with the pulse width modulated output of the DC-DC power conversion stage.

2. The driver circuit according to claim 1, comprising a plurality of DC-DC power conversion stages sharing a common AC-DC boost stage, wherein each DC-DC power conversion stage is controlled to have an independent pulse width modulation to control the brightness of respective LEDs receiving power from the respective DC-DC power conversion stage.

3. The driver circuit according to claim 1, wherein the DC-DC power conversion stage is non-resonant.

4. The driver circuit according to claim 1, wherein the DC-DC power conversion stage comprises a symmetric half-bridge non-resonant DC-DC converter, a high frequency transformer, and a symmetric voltage multiplier output rectifier with purely capacitive output.

5. The driver circuit according to claim 1, wherein the DC-DC power conversion stage is substantially without an electrolytic capacitor passing a load current.

6. The driver circuit according to claim 1, wherein a frequency of operation of the AC-DC boost stage is varied in dependence on at least a varying DC bus voltage, wherein the DC-DC power conversion stage receives power from the DC bus.

7. The driver circuit according to claim 1, wherein the controller is configured to implement cycle by cycle peak current mode control, with time multiplexing, to control both the peak and the average currents to the LED.

8. The driver circuit according to claim 1, wherein the controller is configured to control the switches of the AC-DC boost stage to correct a power factor.

9. The driver circuit according to claim 1, the set of switches in the DC-DC power conversion stage are controlled to short a transformer.

10. A method for driving light emitting diodes (LEDs), comprising:
receiving an alternating current input;
producing a DC current having a voltage with an AC-DC boost stage, having a frequency operation and a maximum load, and a set of switches controlled in dependence on the voltage to limit a peak LED current, the AC-DC boost stage having a load-dependent instantaneous ripple voltage; and
producing an LED drive current with a DC-DC power conversion stage coupled to the AC-DC boost stage with a capacitor, the DC-DC power conversion stage having a set of switches to selectively pulse-width modulate the LEDs to control a brightness, wherein the set of switches in the AC-DC boost stage and the set of switches in the DC-DC power conversion stage are each controlled to switch at zero voltage, and a pulse width modulation frequency of the DC-DC power conversion stage is dependent on the load and the instantaneous ripple voltage.

11. The method according to claim 10, wherein a plurality of DC-DC power conversion stages sharing a common AC-DC boost stage are provided, wherein each DC-DC power conversion stage is controlled to have an independent pulse width modulation to control the brightness of respective LEDs receiving power from the respective DC-DC power conversion stage.

12. The method according to claim 10, wherein the DC-DC power conversion stage is non-resonant.

13. The method according to claim 10, wherein the DC-DC power conversion stage comprises a symmetric half-bridge non-resonant DC-DC converter, a high frequency transformer, and a symmetric voltage multiplier output rectifier with purely capacitive output.

14. The method according to claim 10, operating substantially without an electrolytic capacitor passing a load current.

15. The method according to claim 10, wherein a frequency of operation of the AC-DC boost stage is varied in dependence on at least a varying DC bus voltage, wherein the DC-DC power conversion stage receives power from the DC bus.

16. The method according to claim 10, wherein the controller is configured to implement cycle-by-cycle peak current mode control, with time multiplexing, to control both the peak and the average currents to the LED.

17. The method according to claim 10, wherein the set of switches in the AC-DC boost stage are controlled to correct a power factor.

18. The method according to claim 10, further comprising controlling the set of switches in the DC-DC power conversion stage to short a transformer winding.

19. A driver circuit for light emitting diodes (LEDs), comprising:
an AC-DC boost stage, having a set of switches;
a DC-DC power conversion stage having a set of switches;
a controller configured to control the set of switches in the AC-DC boost stage to provide power to the DC-DC power conversion stage by non-resonant operation at a frequency above a resonant frequency, while limiting a peak LED current, and to control and the set of switches in the DC-DC power conversion stage to selectively pulse-width modulate the LEDs to control an LED brightness by shorting a transformer current, wherein the set of switches in the AC-DC boost stage and the set of switches in the DC-DC power conversion stage are each controlled to switch at zero voltage, and a pulse width modulation frequency of the DC-DC power conversion stage is different from a frequency of operation of the AC-DC boost stage.

20. The driver circuit according to claim 19,
further comprising a non-electrolytic capacitor coupling the AC-DC boost stage and the DC-DC power conversion stage; and
the controller is configured to control a pulse width modulation frequency of the DC-DC power conversion stage dependent on at least a load and an instantaneous ripple voltage produced by the AC-DC boost stage.

* * * * *